United States Patent
Ueda et al.

(10) Patent No.: US 7,253,937 B2
(45) Date of Patent: Aug. 7, 2007

(54) MULTI-BEAM OPTICAL SCANNING DEVICE AND IMAGE FORMING APPARATUS

(75) Inventors: Takeshi Ueda, Kanagawa (JP); Kohji Sakai, Tokyo (JP); Yoshinori Hayashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 11/543,212

(22) Filed: Oct. 5, 2006

(65) Prior Publication Data

US 2007/0091398 A1    Apr. 26, 2007

(30) Foreign Application Priority Data

Oct. 20, 2005  (JP)  ............. 2005-306170
Mar. 17, 2006  (JP)  ............. 2006-075271

(51) Int. Cl.
  *G02B 26/08*  (2006.01)
  *B41J 27/00*  (2006.01)

(52) U.S. Cl. .............. 359/204; 359/205; 359/207; 347/244

(58) Field of Classification Search .............. None
  See application file for complete search history.

(56) References Cited

U.S. PATENT DOCUMENTS 6,094,286 A * 7/2000 Kato ............. 359/206
6,999,208 B2   2/2006 Suzuki et al.
7,126,625 B2 * 10/2006 Shimomura et al. ......... 347/244
2006/0077500 A1  4/2006 Hayashi et al.

FOREIGN PATENT DOCUMENTS

| JP | 11-223783 | 8/1999 |
|----|-----------|--------|
| JP | 2002-214556 | 7/2002 |
| JP | 2003-337295 | 11/2003 |
| JP | 2004-126192 | 4/2004 |
| JP | 2005-258392 | 9/2005 |

* cited by examiner

*Primary Examiner*—James Phan
(74) *Attorney, Agent, or Firm*—Oblon, Spivak, McClelland, Maier & Neustadt, P.C.

(57) ABSTRACT

A multi-beam scanning device is disclosed that is able to realize a stable and small beam spot and realize stable scanning line intervals between plural light beams. The multi-beam optical scanning device includes a first optical system which has a first lens for coupling the light beams from the light sources, and a second lens which is an anamorphic element having power at least in a sub scanning direction and for guiding the light beams from the first lens to the deflection unit; and a second optical system. At least the second lens includes a diffracting surface having power. Magnifications of the whole optical system in a main scanning direction ($\beta m0$) and in a sub scanning direction ($\beta s0$), and a magnification of the second optical system ($\beta s2$) in a sub scanning direction satisfy $|\beta m0|>|\beta s0|$, and $|\beta s0|>|\beta s2|$, and the power of the diffracting surface of the first lens in the main scanning direction (P1m), that in the sub scanning direction (P1s), and the power of the diffracting surface of the second lens in the sub scanning direction (P2s) satisfy $|P2s|>|P1m|$ and $|P2s|>|P1s|$.

18 Claims, 12 Drawing Sheets

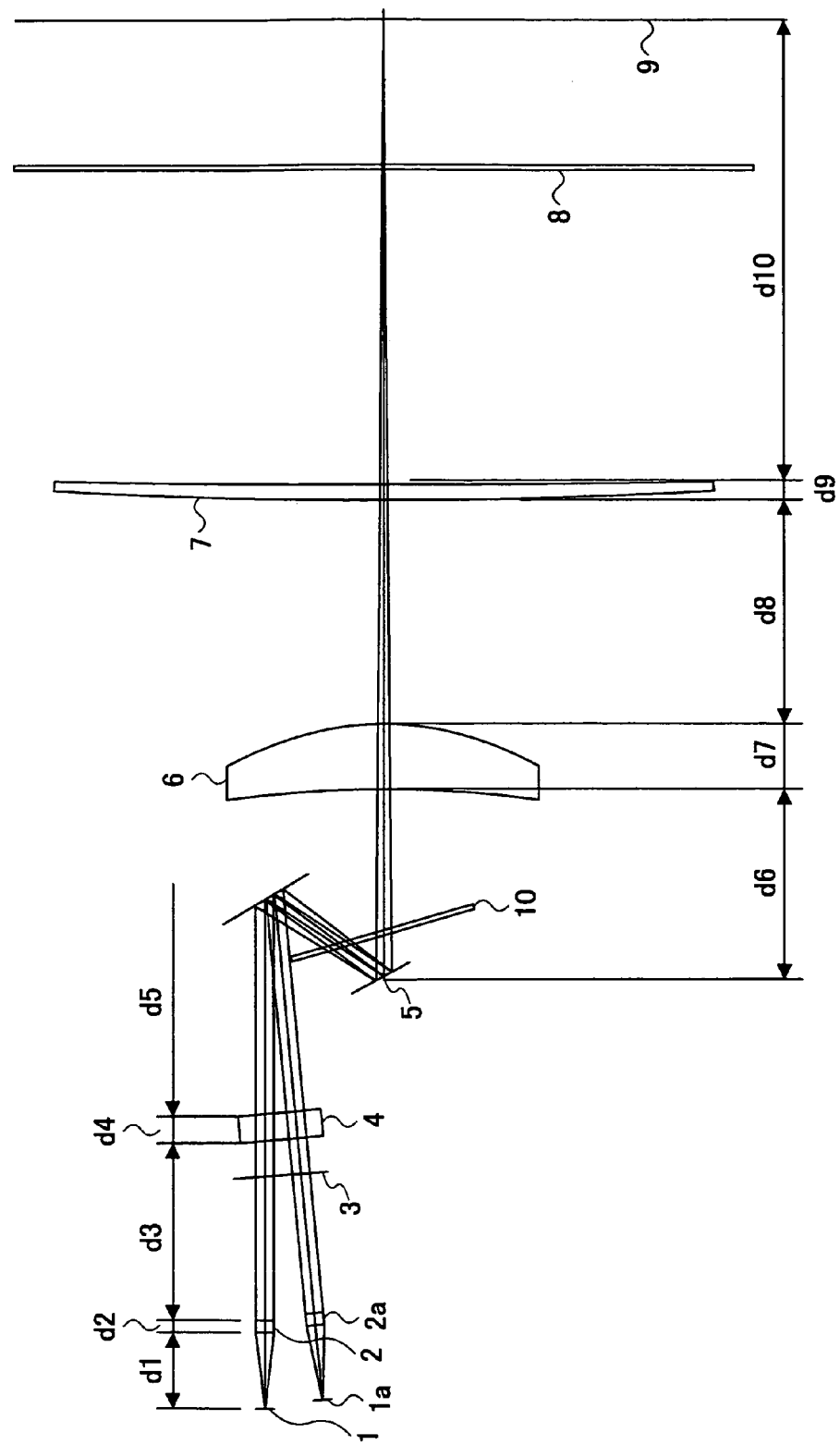

| | example 1 | example 2 | example 3 |
|---|---|---|---|
| $\Delta m1$ | 2.20E-01 | -2.50E-03 | -2.50E-03 |
| $\Delta m2$ | -1.90E-01 | -1.60E-02 | -1.60E-02 |
| $\Delta d1$ | 1.08E-03 | 6.21E-04 | 6.21E-04 |
| f1 | 27.00 | 27.00 | 27.00 |
| $\Delta m3$ | 6.62E-02 | 6.62E-02 | 6.62E-02 |
| f2 | 238.50 | 238.50 | 238.50 |
| left side of formula 12 | 0.01 | 0.00 | 0.00 |
| $\beta m0$ | -8.83 | -8.83 | -8.83 |
| $\beta s0$ | 4.31 | 4.31 | 4.31 |
| $\beta s2$ | -0.98 | -0.98 | -0.98 |
| right side of formula 12 | 0.08 | 0.03 | 0.03 |
| formula 6 & 8 | O | O | O |
| P1m | 0.022 | 0.000 | 0.000 |
| P2m | 0.000 | 0.004 | 0.004 |
| P1s | 0.022 | 0.000 | 0.000 |
| P2s | 0.027 | 0.028 | 0.027 |
| formula 7 | O | O | O |
| left side of formula 7 | 0.01 | 0.00 | 0.00 |
| Wm | 3.20 | 1.20 | 1.20 |
| right side of formula 7 | 0.16 | 0.06 | 0.06 |
| $\Delta m'1$ | 0.05 | 0.13 | 0.13 |
| $\Delta m'2$ | -1.60 | -0.15 | -0.15 |
| $\Delta m'3$ | 0.02 | 0.02 | 0.02 |
| left side of formula 11 | -1.53 | 0.00 | 0.00 |
| $\Delta s1$ | 0.02 | -0.04 | -0.04 |
| $\Delta s2$ | -0.09 | -0.04 | -0.04 |
| $\Delta s3$ | 0.08 | 0.08 | 0.08 |
| $\Delta d1$ | 0.00108 | 0.00062 | 0.00062 |
| $\beta 1$ | -4.40 | -4.40 | -4.40 |
| $\beta 2$ | -0.98 | -0.98 | -0.98 |
| left side of formula 15 | 0.00 | -0.01 | -0.01 |
| Ws | 5.00 | 2.80 | 2.80 |
| right side of formula 15 | 0.13 | 0.07 | 0.07 |
| $\Delta s'1$ | 0.00 | 0.01 | 0.01 |
| $\Delta s'2$ | -0.36 | -0.38 | -0.38 |
| $\Delta s'3$ | 0.02 | 0.02 | 0.02 |
| left side of formula 13 | -0.34 | -0.36 | -0.36 |

FIG.10

| | | example 1 | example 4 | example 5 |
|---|---|---|---|---|
| Formula 10 | $\Delta m'1$ | 0.05 | −2.13E−02 | −2.13E−02 |
| | $\Delta m'2$ | −1.6 | −1.98E−02 | −1.98E−02 |
| | $\Delta m'3$ | 0.04 | 4.00E−02 | 4.00E−02 |
| | Wm | 3.2 | 1.2 | 1.2 |
| | left side | 1.51 | 1.10E−03 | 1.10E−03 |
| | right side | 1.6 | 0.6 | 0.6 |
| Formula 11 | left side | −1.51 | −1.10E−03 | −1.10E−03 |
| Formula 12 | $\Delta m1$ | 2.20E−01 | −6.12E−03 | −6.12E−03 |
| | $\Delta m2$ | −1.9E−01 | 1.47E−02 | 1.47E−02 |
| | $\Delta m3$ | 4.00E−02 | 4.00E−02 | 4.00E−02 |
| | $\Delta d1$ | 1.08E−03 | 6.21E−04 | 6.21E−04 |
| | f1 | 27.0 | 27.0 | 27.0 |
| | f2 | 238.5 | 238.5 | 238.5 |
| | left side | 0.01 | 0.00 | 0.00 |
| | right side | 0.16 | 0.06 | 0.06 |
| Formula 15 | $\Delta s1$ | 0.019 | −5.45E−02 | −5.45E−2 |
| | $\Delta s2$ | −0.087 | −9.75E−03 | −9.75E−03 |
| | $\Delta s3$ | 8.80E−02 | 8.80E−02 | 8.80E−02 |
| | $\beta 1$ | −4.4 | −4.4 | −4.4 |
| | $\beta 2$ | −0.98 | −0.98 | −0.98 |
| | Ws | 5.0 | 2.8 | 2.8 |
| | left side | 0.0 | 0.01 | 0.01 |
| | right side | 0.25 | 0.14 | 0.14 |
| Formula 13 | $\Delta s'1$ | 0.005 | −3.37E−01 | −3.37E−01 |
| | $\Delta s'2$ | −0.8215 | −9.75E−03 | −9.75E−03 |
| | $\Delta s'3$ | 0.300 | 0.003 | 0.003 |
| | left side | 0.5 | 4.68E−02 | 4.68E−02 |
| | right side | 2.5 | 1.4 | 1.4 |
| Formula 14 | left side | −0.5 | −4.68E−02 | −4.68E−02 |
| | L | 102.8 | 61.71 | 61.71 |
| | L2 | 10.0 | 10.0 | 10.0 |
| | L/2 | 51.4 | 30.86 | 30.86 |

MULTI-BEAM OPTICAL SCANNING DEVICE AND IMAGE FORMING APPARATUS

BACKGROUND OF THE INVENTION

1. Field of the Invention

The present invention relates to a multi-beam optical scanning device and an image forming apparatus having the multi-beam optical scanning device.

2. Description of the Related Art

In recent years and continuing, an image forming apparatus, such as a digital copier and a laser printer, can form images by optical scanning at increasingly high density, and perform optical scanning at increasingly high speed so that an image forming apparatus capable of forming images of higher density and optical scanning at higher speed is required. As an effective measure for increasing the optical scanning speed, a multi-beam scanning technique, which involves scanning of a scanning surface by plural light beams at the same time, is being developed and is approaching practical use. By using the multi-beam scanning technique, it is possible to perform high-speed writing without raising the rotational speed of a polygon motor, and this can reduce power consumption.

In addition, a technique of using resin lenses has also been developed for the purpose of reducing cost of the system. When using resin lenses, it is important to ensure an optical scanning device is not adversely influenced by changes of the ambient temperature.

Even when using glass lenses, the surface curvature, thickness, and refractive index of the lens may change due to the temperature variation of the circumstance, and the refractive index of the lens may also change due to variation of the wavelength of a semiconductor laser, which serves as a light source. Due to these changes, the size of light spots becomes large, and this limits the image density. When using the resin lenses, the changes of the surface curvature, thickness, and refractive index of the lens caused by the ambient temperature variation, and the change of the refractive index of the lens caused by variation of the wavelength of a semiconductor laser are larger than the changes for the glass lenses. Hence, in an optical scanning device using the resin lenses, the influence of the ambient temperature variation on the image density is large.

To solve the problem, for example, Japanese Laid Open Patent Application No. 2002-214556 (hereinafter, refer to as "reference 1") discloses a technique in which at least three lenses are combined in an optical system in front of a deflector. In addition, Japanese Laid Open Patent Application No. 11-223783 (hereinafter, refer to as "reference 2") discloses a technique in which a diffracting surface is provided on a scanning lens for correction. Further, the above-mentioned reference 2, and in addition Japanese Laid Open Patent Application No. 2004-126192 and Japanese Laid Open Patent Application No. 2003-337295, (hereinafter, refer to as "reference 3", "reference 4", respectively) disclose techniques in which a resin lens having a diffracting surface is disposed in front of a deflector to reduce the change of the beam spot size caused by the temperature variations.

However, in the technique shown in reference 1, when the number of the lenses rises, the cost of the device rises. In addition, since at least one glass lens is required, this also increases the cost.

In the technique shown in reference 2, since the region through which the light beam passes is broad, it is time-consuming to fabricate the diffracting surface, and this also increases the cost.

In the technique shown in reference 3, since a shift of the beam spot position caused by the temperature change of the optical system behind the deflector (that is, a scanning optical system) is not considered, when a resin optical element is used in the scanning optical system, the shift of the beam spot position cannot be reduced to be sufficiently small.

In the techniques shown in references 2 and 4, since a change of the arrangement of optical elements in the first optical system is not considered, when a resin optical element is used in the scanning optical system, the shift of the beam spot position cannot be reduced to be sufficiently small.

In addition, since plural light sources are used in an optical scanning device operating in the multi-beam scanning scheme, a difference of wavelengths between the plural light beams of the light sources is inevitable. Since the size of light spots changes in response to the light beams having different wavelengths, the wavelength difference of the light beams also affects the image density.

Specifically, since the power of a diffracting surface strongly depends on the wavelength of the incident light beam, in an optical system utilizing diffracting surfaces, if the power of the diffracting surfaces and refractive surfaces are not arranged appropriately, beam spot position shifts between adjacent scanning lines and beam spot sizes differ from each other. This degrades image quality.

As described above, the aforesaid reference 2, reference 3, and reference 4 disclose methods for correcting the ambient temperature variation, but these references do not consider the problem of the wavelength difference of the plural light beams. Hence, even though appropriate correction can be made for one light beam, sometimes, appropriate correction cannot be made for other light beams having different wavelengths.

SUMMARY OF THE INVENTION

The present invention may solve one or more problems of the related art.

A preferred embodiment of the present invention may provide a multi-beam optical scanning device able to realize a stable and small beam spot and realize stable scanning line intervals between plural light beams regardless of wavelength difference of the plural light beams and variation of ambient temperature, and an image forming apparatus using the optical scanning device and able to form an image of high quality.

According to a first aspect of the present invention, there is provided a multi-beam optical scanning device, comprising:

a plurality of light sources;

a deflection unit configured to deflect a plurality of light beams from the light sources;

a first optical system configured to guide the light beams from the light sources to the deflection unit; and a second optical system configured to guide the light beams deflected by the deflection unit to a scanning surface, wherein the first optical system includes a first lens that couples the light beams from the light sources, and a second lens that guides the light beams from the first lens to the deflection unit, said second lens being an anamorphic element having power at least in a sub scanning direction, at least the second lens includes a diffracting surface having a power, and assuming a magnification in a main scanning direction of a whole optical system of the multi-beam optical scanning device is represented by $\beta m0$, a magnification in a sub scanning direction of the whole optical system of the multi-beam optical scanning device is represented by $\beta s0$, and a magnification in a sub scanning direction of the second optical system is represented by $\beta s2$, the following relationships (1) are satisfied:

$$|\beta m0|>|\beta s0|, \text{ and } |\beta s0|>|\beta s2| \qquad (1),$$

and assuming the power of the diffracting surface of the first lens in the main scanning direction is represented by P1m, the power of the diffracting surface of the first lens in the sub scanning direction is represented by P1s, and the power of the diffracting surface of the second lens in the sub scanning direction is represented by P2s, the following relationships (2) are satisfied:

$$|P2s|>|P1m|, \text{ and } |P2s|>|P1s| \qquad (2).$$

As an embodiment, a cross-sectional shape of the diffracting surface of the second lens in the sub scanning direction is the same regardless of a position of the cross section of the diffracting surface in the main scanning direction.

As an embodiment, the multi-beam optical scanning device further comprises a housing to which the deflection unit, the second lens, and the second optical system are attached, wherein the second lens is attached to the housing directly, and a contacting position between the second lens and the housing is near an optical axis of the second lens in the sub scanning direction.

As an embodiment, an aperture is provided between the first lens and the second lens for limiting widths of the light beams at least in the sub scanning direction, and assuming a distance between the first lens and the aperture is represented by L1, and a distance between the aperture and the second lens is represented by L2, the following relationship is satisfied:

$$L1>L2.$$

As an embodiment, assuming a focal length of the first lens is represented by f1, and a distance between the first lens and the second lens is represented by L3, the following relation (3) is satisfied:

$$f1/2<L3<3*f1/2 \qquad (3).$$

As an embodiment, the light beams propagating toward the second lens are being condensed, and incident angles of the light beams incident on the diffracting surface of the second lens are substantially equal to each other.

According to a second aspect of the present invention, there is provided a multi-beam optical scanning device, comprising:

a plurality of light sources;

a deflection unit configured to deflect a plurality of light beams from the light sources;

a first optical system including a first lens that has a diffracting surface with a power and couples the light beams from the light sources, and a second lens that guides the light beams from the first lens to the deflection unit, said second lens being an anamorphic element having a diffracting surface with a power at least in a sub scanning direction; and a second optical system configured to guide the light beams deflected by the deflection unit to a scanning surface, wherein assuming a magnification in a main scanning direction of a whole optical system of the multi-beam optical scanning device is represented by $\beta m0$, a magnification in a sub scanning direction of the whole optical system of the multi-beam optical scanning device is represented by $\beta s0$, and a magnification in a sub scanning direction of the second optical system is represented by $\beta s2$, the following relationships (4) are satisfied:

$$|\beta m0|>|\beta s2|, \text{ and } |\beta s0|>|\beta s2| \qquad (4),$$

and a number of the light beams passing through the first lens is less than a number of the light beams passing through the second lens.

As an embodiment, the number of the light beams passing through the first lens is one.

As an embodiment, the second optical system includes at least one optical element formed from a resin, and assuming that in the first optical system, a change of a position of a main-scanning beam waist caused by power variation of a refractive portion, when a wavelength of one of the light sources increases by 1 nm, is represented by $\Delta m'1$, and a change of a position of the main-scanning beam waist caused by power variation of a diffractive portion, when a wavelength of one of the light sources increases by 1 nm, is represented by $\Delta m'2$, in the second optical system, a change of a position of a main-scanning beam waist caused by power variation, when a wavelength of one of the light sources increases by 1 nm, is represented by $\Delta m'3$, and a depth of a diameter of the main scanning beam on the scanning surface is represented by Wm, the following relationship (5) is satisfied:

$$|\Delta m'1+\Delta m'2+\Delta m'3|<Wm/2 \qquad (5).$$

As an embodiment, the following relationship (6) is satisfied:

$$\Delta m'1+\Delta m'2+\Delta m'3<0 \qquad (6).$$

As an embodiment, assuming that in the first optical system, a change of a position of a main-scanning beam waist caused by power variation of a refractive portion, when a temperature increases by 1° C., is represented by $\Delta m1$, and a change of a position of the main-scanning beam waist caused by power variation of a diffractive portion, when a temperature increases by 1° C., is represented by $\Delta m2$, in the second optical system, a change of a position of a main-scanning beam waist caused by power variation, when a temperature increases by 1° C., is represented by $\Delta m3$, a change of a distance between one of the light sources and a main scanning front principal point, when a temperature increases by 1° C., is represented by $\Delta d1$, a focal length of the first optical system in the main scanning direction is represented by f1, and a focal length of the second optical system in the main scanning direction is represented by f2, then
the following relationship (7) is satisfied:

$$\Delta m1+\Delta m2+\Delta m3-\Delta d1\times(f2/f1)^2<Wm/40 \qquad (7)$$

As an embodiment, assuming that
in the first optical system, a change of a position of a sub-scanning beam waist caused by power variation of a refractive portion, when a wavelength of one of the light sources increases by 1 nm, is represented by $\Delta s'1$, and a change of a position of the sub-scanning beam waist caused by power variation of a diffractive portion, when a wavelength of one of the light sources increases by 1 nm, is represented by $\Delta s'2$,
in the second optical system, a change of a position of a main-scanning beam waist caused by power variation, when a wavelength of one of the light sources increases by 1 nm, is represented by $\Delta s'3$, and
a depth of a diameter of the main scanning beam on the scanning surface is represented by Wm,
the following relationship (8) is satisfied:

$$|\Delta s'1+\Delta s'2+\Delta s'3|<Ws/2 \qquad (8)$$

As an embodiment, the following relationship (9) is satisfied:

$$\Delta s'1+\Delta s'2+\Delta s'3<0 \qquad (9)$$

As an embodiment, assuming that
in the first optical system, a change of a position of the sub-scanning beam waist caused by power variation of a refractive portion, when a temperature increases by 1° C., is represented by $\Delta s1$, and a change of a position of the sub-scanning beam waist caused by power variation of a diffractive portion, when a temperature increases by 1° C., is represented by $\Delta s2$,
in the second optical system, a change of a position of a sub-scanning beam waist caused by power variation, when a temperature increases by 1° C., is represented by $\Delta s3$,
a change of a distance between one of the light sources and a sub scanning front principal point, when a temperature increases by 1° C., is represented by $\Delta d1$,
a magnification of the first optical system in the sub scanning direction is represented by $\beta 1$, and
a magnification of the second optical system in the sub scanning direction is represented by $\beta 2$, then
the following relationship (10) is satisfied:

$$\Delta s1+\Delta s2+\Delta s3-\Delta d1\times(\beta 1\times\beta 2)^2<Ws/40 \qquad (10)$$

As an embodiment, the first optical system includes at least one resin lens having a diffracting surface.
As an embodiment, a diameter of one of the light beams in the main scanning direction is greater than a diameter of one of the light beams in the sub scanning direction.
As an embodiment, the first optical system includes at least one resin lens having a diffracting surface.
According to a third aspect of the present invention there is provided an image forming apparatus, comprising:
a multi-beam optical scanning device,
wherein
the multi-beam optical scanning device includes
a plurality of light sources;
a deflection unit configured to deflect a plurality of light beams from the light sources;
a first optical system configured to guide the light beams from the light sources to the deflection unit; and
a second optical system configured to guide the light beams deflected by the deflection unit to a scanning surface,
wherein
the first optical system includes
a first lens that couples the light beams from the light sources, and
a second lens that guides the light beams from the first lens to the deflection unit, said second lens being an anamorphic element having power at least in a sub scanning direction,
at least the second lens includes a diffracting surface having a power, and
assuming
a magnification in a main scanning direction of a whole optical system of the optical scanning device is represented by $\beta m0$,
a magnification in a sub scanning direction of the whole optical system of the optical scanning device is represented by $\beta s0$, and
a magnification in a sub scanning direction of the second optical system is represented by $\beta s2$, then
the following relationships are satisfied:

$$|\beta m0|>|\beta s0|, \text{ and } |\beta s0|>|\beta s2|, \text{ and}$$

assuming
the power of the diffracting surface of the first lens in the main scanning direction is represented by P1m,
the power of the diffracting surface of the first lens in the sub scanning direction is represented by P1s, and the power of the diffracting surface of the second lens in the sub scanning direction is represented by P2s, then
the following relationships are satisfied:

$$|P2s|>|P1m|, \text{ and } |P2s|>|P1s|.$$

According to the present invention, in a multi-beam optical scanning device, regardless of wavelength difference of the plural light beams and variation of ambient temperature, it is possible to realize stable and small beam spots and stable scanning line intervals between light beams, and it is possible to realize an image forming apparatus using the optical scanning device which is able to form an image of high quality.

These and other objects, features, and advantages of the present invention will become more apparent from the following detailed description of preferred embodiments given with reference to the accompanying drawings.

BRIEF DESCRIPTION OF THE DRAWINGS

FIG. 1A is a schematic cross-sectional view illustrating a configuration of an optical scanning device in a main scanning direction according to an embodiment of the present invention;

FIG. 6A shows the light beam diameters in the main scanning direction, and FIG. 6B shows the light beam diameters in the sub scanning direction;

FIG. 7A shows the light beam diameters in the main scanning direction, and FIG. 7B shows the light beam diameters in the sub scanning direction;

FIG. 8A shows the light beam diameters in the main scanning direction, and FIG. 8B shows the light beam diameters in the sub scanning direction;

FIG. 9 is a table summarizing measured values of the parameters described above in examples 1 through 3, and results indicating whether formulae (6), (7), and (9) are satisfied;

FIG. 10 is another table summarizing other measured values of the parameters described above in examples 1 through 3.

DESCRIPTION OF THE PREFERRED EMBODIMENTS

Below, preferred embodiments of the present invention are explained with reference to the accompanying drawings.

FIG. 1A is a schematic cross-sectional view illustrating a configuration of an optical scanning device in a main scanning direction according to an embodiment of the present invention.

Figure 1B:
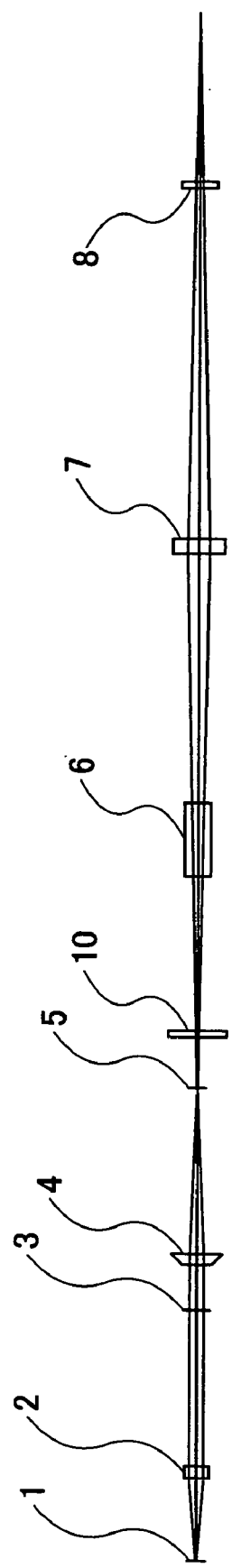
FIG. 1B is a schematic cross-sectional view illustrating a configuration of an optical scanning device in a sub scanning direction according to the embodiment of the present invention.

FIG. 1B is a schematic cross-sectional view illustrating a configuration of an optical scanning device in a sub scanning direction according to the embodiment of the present invention.

The optical scanning device shown in FIG. 1A includes semiconductor lasers 1 and 1*a* serving as light sources, coupling lenses 2 and 2*a*, an aperture 3, an anamorphic lens 4, a polygon mirror 5, a deflector-side scanning lens 6, an image-plane side scanning lens 7, a dustproof glass 8, a scanning surface 9, and a soundproof glass 10.

The polygon mirror 5 acts as a deflection unit for deflecting the light beam from the light sources.

Here, the coupling lenses 2 and 2*a* correspond to the first lens of the first optical system in claims of the application, the anamorphic lens 4 corresponds to the second lens of the first optical system in claims of the application, and the deflecting reflective surface of the polygon mirror 5 corresponds to the deflection unit in claims of the application. The first optical system guides the light beam from the light sources to the deflection unit, here, the polygon mirror 5. The second optical system guides the light beam from the polygon mirror 5 to the scanning surface.

The semiconductor lasers 1 and 1*a*, the coupling lenses 2 and 2*a*, the aperture 3, the anamorphic lens 4, a deflecting reflective surface of the polygon mirror 5, a deflector-side scanning lens 6, an image-plane side scanning lens 7, a dustproof glass 8, a scanning surface 9, and a soundproof glass 10 are accommodated in a housing of the optical scanning device. The dustproof glass 8 closes (seals) a window through which light beams for scanning are transmitted from the housing so as to prevent dust from entering the inside of the housing.

The scanning surface 9 is constituted by the photoconductive surface of a photo conductor.

The deflector-side scanning lens 6 and the image-plane side scanning lens 7 constitute the second optical system for condensing light beams deflected by the polygon mirror 5 onto the scanning surface 9. The polygon mirror 5 is held in a case. The dustproof glass 8 closes the window through which the light beams are incident on the polygon mirror 5 so as to soundproof the wind roar produced by the polygon mirror 5, and the deflected light beams are transmitted.

For example, each of the light sources 1 and 1*a* is a semiconductor laser covered by a 0.3 mm-thick glass.

Below, for the purpose of comparison, an optical scanning device without a diffraction surface is considered first as an example for comparison. Specifically, in the optical scanning device, the optical system is optimized without using a diffraction surface such that the light beam from the light source 1 is directed to form an image on the image plane 9 in both the main scanning direction and the sub scanning direction.

In the example for comparison, the light beam from the light source 1 is converted into a weak-divergent light beam by the coupling lens 2. The weak-divergent light beam propagates through the aperture 3, and is converted, by the anamorphic lens 4, into a parallel light beam in the main scanning direction, and into a focused light beam in the sub scanning direction, which is focused near the deflecting reflective surface of the polygon mirror 5. The light beam from the anamorphic lens 4 is deflected by the polygon mirror 5, and through the deflector-side scanning lens 6, the image-plane side scanning lens 7, and the dustproof glass 8, an image is formed on the scanning surface 9.

For example, the light source 1 and the coupling lens 2 are fixed on the same base member, and the base member is made of aluminum.

Optical data which optimize the optical system above are shown below.

The wavelength of the light source 1 is 780.1 nm at a temperature of 25° C., and 786.5 nm at a temperature of 45° C.

The surface shape (lens form) of the coupling lens 2 is described below.

The surface shape of the coupling lens 2 on the light source side is a rotational-symmetric aspheric surface as described by the following formula 1.

$$x = (h^2/R)/[1+\sqrt{1-(1+K)(h/R)^2}] + A4 \cdot h^4 + A6 \cdot h^6 + A8 \cdot h^8 + A10 \cdot h^{10} \quad \text{(formula 1)}$$

where, h represents a distance from the optical axis, R represents the near-axis curvature radius, K represents a conic constant, A4, A6, A8, A10 are high-order coefficients, and x represents the depth in the optical axis direction.

Specifically, values of the above parameters expressing the surface shape of the coupling lens 2 on the light source side are as follows.

R=86.09118
K=361.987634
A4=−0.827025E−04
A6=−0.413360E−05
A8=0.942600E−06
A10=−0.936986E−07.

Here, for example, "−0.936986E−07" represents "−0.936986×10$^{-07}$". This is true for the other values.

The surface shape of the coupling lens 2 on the image side is also a rotational-symmetric aspheric surface as described by the above formula 1, and the values of the parameters R, K, A4, A6, A8, A10, which express the surface shape of the coupling lens on the light source side are as follows.

R=−8.71000
K=−0.310240
A4=0.592273E−04
A6=0.250465E−06
A8=0.119847E−06
A10=−0.563217E−08.

The surface shape of the anamorphic lens 4 is an anamorphic surface as described by the following formula 2.

$$x=\{(1/Rm)\cdot y^2+(1/Rs)\cdot z^2)\}/[1+\sqrt{\{1-(y/Rm)^2-(z/Rs)^2\}}]$$ (formula 2)

where y represents a distance from the optical axis in the main scanning direction, z represents a distance in the sub scanning direction, Rm represents the curvature radius in the main scanning direction, Rs represents the curvature radius in the sub scanning direction, and x represents the depth in the optical axis direction.

Specifically, values of the above parameters expressing the surface shape of the anamorphic lens 4 on the light source side are as follows.

Rm=500, Rs=35.83

The surface shape of the anamorphic lens 4 on the image side is a plane.

The surface shape (lens form) of the deflector-side scanning lens 6 is described below.

The surface shape of the deflector-side scanning lens 6 on the light source side is a rotational-symmetric aspheric surface (coaxial aspheric surface) as described by the above formula 1. The values of the parameters expressing the surface shape of the deflector-side scanning lens 6 on the light source side are as follows.

R=−312.6
K=2.667
A4=1.79E−07
A6=−1.08E−12
A8=−3.18E−14
A10=3.74E−18.

The surface shape of the deflector-side scanning lens 6 on the image side is a rotational-symmetric aspheric surface (coaxial aspheric surface) as described by the above formula 1. The values of the parameters expressing the surface shape of the deflector-side scanning lens 6 on the image side are as follows.

R=−83.0
K=0.02
A4=2.50E−07
A6=9.61E−12
A8=4.54E−15
A10=−3.03E−18.

The apexes of the two surfaces of the deflector-side scanning lens 6 are shifted upward by 1.116 mm relative to the principal light ray in FIG. 1A.

The surface shape (lens form) of the image-plane side scanning lens 7 is described below.

In the main scanning direction, the surface shape of the image-plane side scanning lens 7 on the light source side is a non-circular arc, as described by the following formula 3, and in the sub scanning direction, the surface shape of the image-plane side scanning lens 7 on the light source side is described by the following formula 4, in which the curvature radius in the sub scanning direction (that is, the curvature radius in the cross section in the sub scanning direction) varies continuously along the main scanning direction.

$$x=(y^2/Rm)/[1+\sqrt{\{1-(1+K)\,(y/Rm)^2\}}]+A4\cdot y^4+A6\cdot y^6+A8\cdot y^8+A10\cdot y^{10}$$ (formula 3)

where y represents a distance from the optical axis in the main scanning direction, Rm represents the curvature radius in the main scanning direction near the optical axis, K represents the conic constant, A4, A6, A8, A10 are high-order coefficients, and x represents the depth in the optical axis direction.

$$Rs(y)=Rs+\Sigma bj\cdot y^j \quad (j=1,2,3,\ldots)$$ (formula 4)

where y represents a distance from the optical axis in the main scanning direction, Rs(y) represents the curvature radius in the sub scanning direction at a distance y from the optical axis in the main scanning direction, Rs represents the curvature radius in the sub scanning direction, and bj is a high-order coefficient.

Specifically, values of the above parameters expressing the surface shape of the image-plane side scanning lens 7 on the light source side are as follows.

Rm=−500
K=−71.73
A4=4.33E−08
A6=−5.97E−13
A8=−1.28E−16
A10=5.73E−21
Rs=−47.7
b2=1.60E−03
b4=−2.32E−07
b6=1.60E−11
b8=−5.61E−16
b10=2.18E−20
b12=−1.25E−24.

The surface shape of the image-plane side scanning lens 7 on the image side is a toroidal surface, and the shape in a cross section in the sub scanning direction is a circular arc, as described by the following formula 5.

$$x=(z^2/Rs)/[1+\sqrt{\{1-(z/Rs)^2\}}]$$ (formula 5)

where z represents a distance from the optical axis in the sub scanning direction, Rs represents the curvature radius in the cross section in the sub scanning direction near the optical axis, and x represents the depth in the optical axis direction.

The values of parameters expressing the surface shape of the image-plane side scanning lens 7 on the image side are as follows.

Rm=−1000, Rs=23.38

The apexes of the two surfaces of the image-plane side scanning lens 7 are shifted upward by 1.2 mm relative to the principal light ray in FIG. 1A.

Distances d1 through d10 as shown in FIG. 1A indicate the distances between surfaces of the lenses, that is, surface intervals. For example, the surface intervals d1 through d10 take the following values (in mm).

d1=12.843
d2=3.8
d3=102.8
d4=3.0
d5=69.3
d6=51.7
d7=31.4
d8=78.0
d9=3.5
d10=143.62.

Both the dustproof glass 8 and the soundproof glass 10 are formed from glass which is 1.9 mm thick at 25° C., the refractive index of the glass is 1.511161 at a light source wavelength of 780.1 nm and at a temperature of 25° C., and is 1.511161 at a light source wavelength of 786.5 nm and at a temperature of 45° C., and the linear expansion coefficient is $7.5E-06K^{-1}$.

Under the above conditions, the focus position on the scanning surface can be calculated as below, while taking into consideration dependence of the light source wavelength, the refractive index, the surface shape, and the lens thickness on the temperature.

| | focus position | |
|---|---|---|
| Temperature | Main scan direction | Sub scan direction |
| 25° C. | 0.0 mm | 0.0 mm |
| 45° C. | 11.6 mm | 3.3 mm |

These results reveal that when the temperature changes from 25° C. to 45° C., the focus position varies greatly in both the main scanning direction and the sub scanning direction, specifically, the focus position shifts from 0.0 mm to 11.6 mm in the main scanning direction, and from 0.0 mm to 3.3 mm in the sub scanning direction.

In the above, an optical scanning device is described as the example for comparison, in which the image-forming performance is good at a temperature of 25° C., but the device is strongly influenced by ambient temperature changes, and the focus position varies in both the main scanning direction and the sub scanning direction; thus, the shape of the light spot changes and the size of the light spot becomes large, which degrades the image quality.

Below, an optical scanning device is described which has a diffraction surface. The configuration of the optical scanning device is the same as that shown in FIG. 1A.

In this example, each of the light sources 1 and 1a is a semiconductor laser covered by a 0.3 mm-thick glass. Each of the light sources 1 and 1a may be a single light beam or may be a semiconductor laser array. Alternatively, one of the light sources 1 and 1a may be a single light beam and the other one may be a semiconductor laser array. For example, when each of the light sources 1 and 1a is formed from an arrangement of one or more semiconductor laser elements each including one or more light emission spots, the emitted light beams can be condensed by using a prism.

For example, the light beams from the light sources 1 and 1a are converted into nearly parallel light beams by the coupling lenses 2 and 2a, which correspond to the first lens of the first optical system in claims of the present application. The nearly parallel light beams propagate through the aperture 3, and are converted into focusing light beams in the sub scanning direction by the anamorphic lens 4, which corresponds to the second lens of the first optical system in claims of the present application. The focusing light beams in the sub scanning direction are focused as lines near the deflecting reflective surface of the polygon mirror 5. The light beams from the anamorphic lens 4 are deflected by the polygon mirror 5, and then by the deflector-side scanning lens 6, and the image-plane side scanning lens 7, which constitute the second optical system, and through the dustproof glass 8, so that an image is formed on the scanning surface 9.

As described above, the light sources 1, 1a and the coupling lenses 2, 2a are fixed on the same base member. In addition, all lenses are made of resins. Particularly, when a lens having a diffracting surface is made of a resin, a negative grating of the diffracting surface can be drawn on a mold beforehand, and the shape of the grating can be transferred by injection molding or heat molding, and thus mass production is possible.

The coupling lens 2 is a resin lens having a diffracting surface on the light source side and an aspheric refractive surface on the image side; the diffracting surface on the light source side has the same positive power in both the main scanning direction and the sub scanning direction, and the aspheric refractive surface on the image side has a positive power.

Here, the diffracting surface is configured to induce a change of the refractive angle with wavelength variations in a direction opposite to that of a usual refractive surface.

By giving a portion of the positive power of the whole optical scanning system to the diffracting surface, it is possible to correct the temperature-change-induced focus position shift caused by the resin coupling lens 2, and to correct the temperature-change-induced focus position shift caused by other resin lenses in the optical system.

Further, if the positive power of the coupling lens 2 is carried only by the diffracting surface, the diffracting surface will be too sensitive relative to the wavelength changes. In this case, it is preferable to provide a refractive surface having a positive power.

In addition, since the power of the diffracting surface of the coupling lens 2 in the main scanning direction is the same as the power of the diffracting surface of the coupling lens 2 in the sub scanning direction, when fixing the coupling lens 2, even if rotation of the coupling lens 2 with respect to the optical axis occurs, the performance of the coupling lens 2 can hardly be degraded.

The anamorphic lens 4 is a resin lens having a refractive surface on the light source side and a diffracting surface on the image side; the refractive surface on the light source side has a negative power only in the sub scanning direction, and the diffracting surface on the image side has a positive power only in the sub scanning direction.

As described above, the temperature-change-induced focus position shift in the main scanning direction can be corrected by the diffracting surface of the coupling lens 2. However, since the positive power of the whole optical scanning system in the sub scanning direction is greater than that in the main scanning direction, in order to correct the temperature-change-induced focus position shift in the sub scanning direction, a positive power of a diffracting surface in the sub scanning direction is further required. The diffracting surface of the anamorphic lens 4 having a positive power only in the sub scanning direction is provided for this purpose.

The total power of the anamorphic lens 4 is determined by an object value of the diameter of the beam spot, and it is less than the positive power of the diffracting surface necessary to correcting the temperature-change-induced focus position shift in the sub scanning direction. Due to this, the refractive surface of the anamorphic lens 4 is configured to have a negative power, and as a result, the total power of the anamorphic lens 4 can be set in an appropriate range, while the power of the diffracting surface is maintained to be positive.

In addition, since the whole optical scanning system has a positive power in both the main scanning direction and the sub scanning direction, when the temperature rises, while the focal length of the whole optical scanning system extends in the positive direction, the concave surface (the refractive surface having a negative power) expands due to heat, and thus the temperature-change-induced focus position shift is reduced.

As shown in FIG. 1A, there are two semiconductor lasers (the light sources 1 and 1a) so that two light beams scan the scanning surface 9 at the same time in each scanning operation. It is certain that the present embodiment is not limited to two light sources, but the number of the light sources can be three or more, and the write speed is high when there are many light emission spots.

In addition, the light sources may be formed by a semiconductor laser having plural light emission spots, by a semiconductor laser array including plural semiconductor lasers formed in a monolithic manner, by a combination of a semiconductor laser having a single light emission spot and a semiconductor laser array, or may be formed by plural semiconductor laser arrays.

Below, embodiments of the optical scanning device according to the present invention are described with reference to FIG. 1A.

When it is desired to reduce the temperature-change-induced beam spot position shift by disposing a resin lens having a refractive surface in front of a deflector, it is necessary to consider not only wavelength changes of the semiconductor lasers caused by temperature changes, but also changes of the refractive indexes of the lens materials caused by temperature changes, and changes of the lens shape caused by thermal expansion.

When making such corrections, if the wavelengths of plural light sources are different from each other, a difference between beam waist positions between light beams arises. It has been attempted to reduce the difference of the wavelengths of plural light sources; however, when using the semiconductor lasers in plural packages, individual differences of the semiconductor lasers exist. In addition, even when using a monolithic semiconductor laser array, actually, it is impossible to completely eliminate the wavelength difference of plural light emission spots.

Here, assume the light source 1 shown in FIG. 1A is a monolithic semiconductor laser array, and plural light beams from the light source 1 propagate through the coupling lens 2 and the anamorphic lens 4. In the present embodiment, it is preferable that the positive power of the diffracting surface be controlled as described below.

Assuming the magnification of the whole optical system in the main scanning direction is represented by $\beta m0$, the magnification of the whole optical system in the sub scanning direction is represented by $\beta s0$, and the magnification of the second optical system in the sub scanning direction is represented by $\beta s2$, then it is preferable that the following formula 6 be satisfied:

$|\beta m0|>|\beta s0|$, and $|\beta s0|>|\beta s2|$ (formula 6).

In a multi-beam system, a difference between the beam spot positions in the main scanning direction may disappear by scanning, and does not become a problem. However, in the sub scanning direction, a difference of the beam spot positions may greatly influence the sub scanning beam pitch, and thus influence the optical performance. Therefore, it is preferable that the magnification of the whole optical system in the main scanning direction be greater than the magnification of the whole optical system in the sub scanning direction; this reduces uncertainty of the sub scanning beam pitch caused by variation of the light source, and results in scanning images of high quality.

In addition, assuming the power of the diffracting surface of the first lens (the coupling lens 2) in the main scanning direction is represented by P1m, the power of the diffracting surface of the coupling lens 2 in the sub scanning direction is represented by P1s, and the power of the diffracting surface of the second lens (anamorphic lens 4) in the sub scanning direction is represented by P2s, then it is preferable that the following formula 7 be satisfied:

$|P2s|>|P1m|$, and $|P2s|>|P1s|$ (formula 7)

In formula 6, when the relation $|\beta m0|>|\beta s0|$ is satisfied, the light beams can be focused as lines by the second lens (the anamorphic lens 4) during propagation, and this makes it easy to make the relationship between the deflecting reflective surface of the polygon mirror 5 and the scanning surface 9 close to a conjugate relationship.

In addition, when using plural light sources, it is important to maintain the scanning line intervals in the sub scanning direction to be constant. When the relationship $|\beta m0|>|\beta s0|$ is satisfied, it is possible to maintain the scanning line intervals in the sub scanning direction to be constant.

Conversely, in formula 6, when the relationship $|\beta s0|>|\beta s2|$ is not satisfied, the focal length of the anamorphic lens 4 in the sub scanning direction becomes short, and this requires the anamorphic lens 4 and the polygon mirror 5 to be arranged close to each other. However, if the anamorphic lens 4 and the polygon mirror 5 are too close, it is difficult to make an appropriate optical layout. In addition, due to the heat from the polygon mirror 5, the temperature of the anamorphic lens 4 rises, and this induces very large changes of the beam waist positions in the sub scanning direction. Further, when the focal length of the anamorphic lens 4 in the sub scanning direction becomes short, the opening of the aperture 3 in the sub scanning direction should be small for the purpose of beam shaping. However, when the opening of the aperture 3 in the sub scanning direction is too small, the amount of light becomes insufficient.

In addition to formula 6 being satisfied, when a diffracting surface is used in the first optical system, in order to reduce the influence from the difference of wavelengths between plural light sources, it is preferable that formula 7 be satisfied.

From formula 6, one has $|\beta m0|>|\beta s0|>|\beta s2|$. Due to this, the change of the beam waist position caused by power variation of the coupling lens 2 in the main scanning direction is large compared to the change of the beam waist position caused by power variation of the anamorphic lens 4 in the sub scanning direction. Since the power variation caused by the wavelength difference in the multi-beam optical scanning system is proportional to the original power of the diffractive surface, it is sufficient to set $|P2s|$, which is seldom influenced by the power variation, larger than $|P1m|$.

Similarly, since $|\beta s0|>|\beta s2|$ is satisfied, it is sufficient to set $|P2s|$ to be larger than $|P1s|$.

The above issues are subjects specific to multi-beam optical scanning, and these problems do not occur in single beam optical scanning.

In addition, since the dynamic beam spot diameter in the sub scanning direction is less than the dynamic beam spot diameter in the main scanning direction, the beam spot diameter in the sub scanning direction is more likely to be affected by temperature variation and wavelength difference between light emission spots. In order to compensate for this, it is preferable that the power of the diffracting surface in the sub scanning direction be greater than the power of the diffracting surface in the main scanning direction.

It should be noted that since formula 7 requires that the powers of the diffracting surfaces of the first lens P1s and P1m be less than the powers of the diffracting surfaces of the second lens P2s and P2m, one or two of the powers of the diffracting surfaces of the first lens P1s and P1m may be zero. For example, it may be set that the first lens does not have any diffracting surface. In other words, among the first lens and the second lens, it is sufficient that at least the second lens include a diffracting surface having a power.

Another embodiment of the present invention is described below.

In multi-beam optical scanning, when plural light beams pass through the anamorphic lens 4, usually, centers of the light beams may deviate from the main scanning direction. In addition, even though the centers of the light beams overlap at a designed medium value, the centers of the light beams may still deviate from the main scanning direction due to mechanical arrangement errors.

Figure 2:
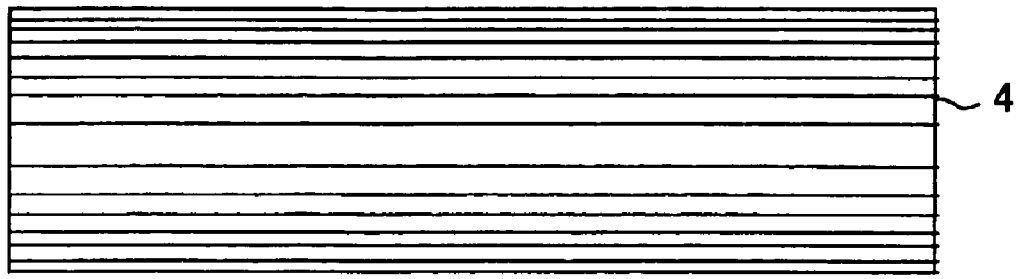
FIG. 2 is a schematic view of the anamorphic lens 4 viewed from the direction of the optical axis with the main scanning direction being along the horizontal direction.

FIG. 2 is a schematic view of the anamorphic lens 4 viewed from the direction of the optical axis with the main scanning direction being along the horizontal direction.

As shown in FIG. 2, by forming a diffractive surface including long linear gratings in the main scanning direction, even when the centers of the light beams deviate from each other in the main scanning direction, the power in the sub scanning direction can be set to be the same for the plural light beams. Due to this, it is possible to set the temperature-change-induced beam spot position shifts in the sub scanning direction to be the same, and thus it is possible to reduce variations of the beam pitch in the sub scanning direction on the scanning surface, and maintain the scanning line intervals in the sub scanning direction to be constant.

Another embodiment of the present invention is described below.

The power variation along with a wavelength change is large on the refractive surface. Thus, when the wavelengths of the plural light beams incident on the anamorphic lens 4 change with the temperature, the power variation on the refractive surface is large for the light beams wavelengths which have changed. For this reason, if the incident positions of the light beams of varied wavelengths on the refractive surface of the anamorphic lens 4 shift in the sub scanning direction, due to the power variations on the refractive surface in the sub scanning direction, the beam spot positions of the light beams in the sub scanning direction may shift on the scanning surface. Especially, in a color optical scanning device including plural scanning optical systems, the relative beam spot positions in the sub scanning direction between different colors may shift.

As described above, the shift of the incident positions of the light beams on the refractive surface of the anamorphic lens 4 in the sub scanning direction is caused by thermal deformation of the anamorphic lens 4 in the sub scanning direction due to temperature changes.

Figure 3A:
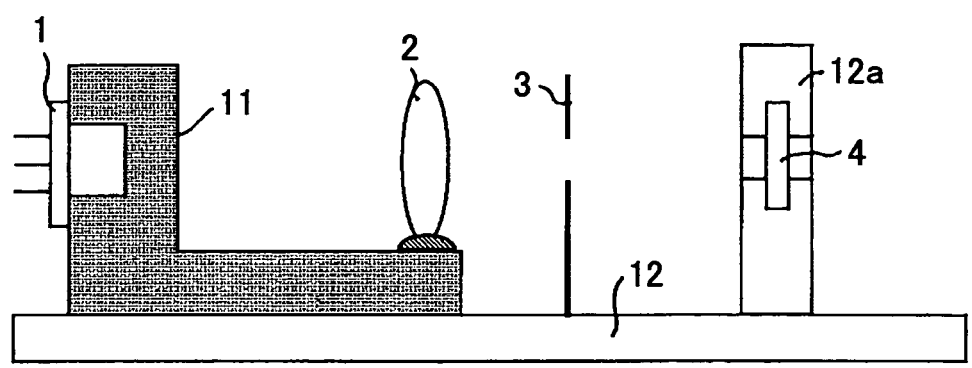
FIG. 3A and FIG. 3B are schematic views illustrating principal portions of a scanning optical system of an optical scanning device according to an embodiment of the present invention.
Figure 3B:
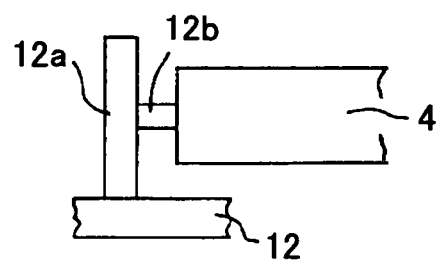

FIG. 3A and FIG. 3B are schematic views illustrating principal portions of a scanning optical system of an optical scanning device according to an embodiment of the present invention.

As shown in FIG. 3A and FIG. 3B, the anamorphic lens 4 (the second lens) is directly attached to a housing 12, and a portion of the anamorphic lens 4 contacting the housing 12, that is, a connection portion 12b connected to a projecting portion 12a of the housing 12, is arranged near the optical axis of the anamorphic lens 4 in the sub scanning direction. Due to this, even when the anamorphic lens 4 expands in the sub scanning direction along with temperature changes, the positions at which the light beams pass through the refractive surface of the anamorphic lens 4 in the sub scanning direction do not change, and this reduces the beam spot position shift on the scanning surface in the sub scanning direction.

In FIG. 3A, there is a base member 11 for fixing the light source 1 and the coupling lens 2. As described above, the light source 1 and the coupling lens 2 are fixed on the same base member 11, and the base member 11 is made of aluminum.

Another embodiment of the present invention is described below.

As described above, since the power variation along with a wavelength change is large on the refractive surface, when the incident positions of the light beams on the refractive surface of the anamorphic lens 4 in the sub scanning direction deviate from the optical axis in the sub scanning direction, the beam spot positions on the scanning surface may shift in the sub scanning direction. Especially, if the incident positions of the light beams are different between different light beams on the anamorphic lens 4, and when wavelength differences exist between different light beams, or alternatively, when the temperature changes, the variations of the beam pitches in the sub scanning direction on the scanning surface increase, that is, the scanning line intervals in the sub scanning direction increase.

Figure 4:
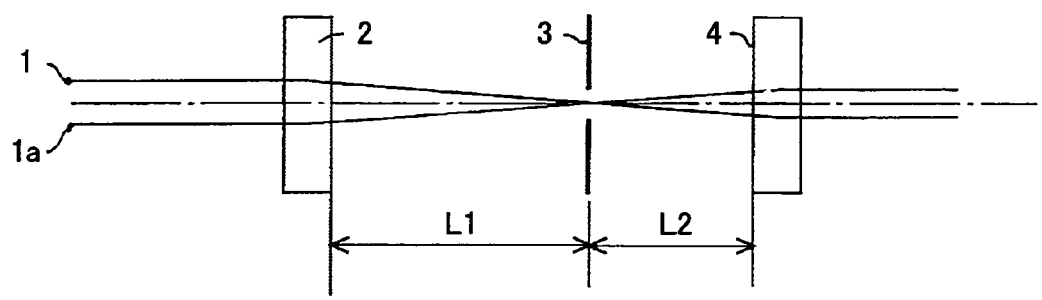
FIG. 4 is a schematic view illustrating a principal portion of a scanning optical system of an optical scanning device according to an embodiment of the present invention.

FIG. 4 is a schematic view illustrating a principal portion of a scanning optical system of an optical scanning device according to an embodiment of the present invention.

As shown in FIG. 4, if the distance between the coupling lens 2 (the first lens) and the aperture 3 is represented by L1, and the distance between the aperture 3 and the anamorphic lens 4 (the second lens) is represented by L2, it is preferable that L1 and L2 satisfy the relationship L1>L2.

Under such a condition, it is possible to reduce the relative difference in the sub scanning direction between multiple light beams, which are incident on the anamorphic lens 4, and it is possible to reduce the variations of the beam pitches in the sub scanning direction, that is, reduce the variations of the scanning line intervals.

As another embodiment of the present invention, if the focal length of the coupling lens 2 (the first lens) is represented by f1, and the distance between the coupling lens 2 (the first lens) and the anamorphic lens 4 (the second lens) is represented by L3, it is preferable that the following formula 8 be satisfied.

$$f1/2 < L3 < 3*f1/2 \qquad \text{(formula 8)}$$

That is, if the distance L3 between the coupling lens 2 and the anamorphic lens 4 is set to be close to the focal length f1 of the coupling lens 2, the same effect as described above is obtainable.

Another embodiment of the present invention is described below.

It is preferable that the multiple light beams propagating toward the anamorphic lens 4 (the second lens) are being condensed, and the incident angles of the light beams incident on the diffracting surface of the anamorphic lens 4 be substantially the same.

Due to this, the diffraction efficiencies of the multiple light beams are nearly the same, and the amount of light is nearly the same. Further, the variations of the diffraction efficiencies due to wavelength changes are also nearly the same.

As shown in FIG. 1A, in the main scanning plane, the light beams from the light sources 1 and 1a are divergent, and are converted into nearly parallel light beams by the coupling lenses 2 and 2a; thus the incident angles of the light beams incident on the anamorphic lens 4 are nearly the same.

Another embodiment of the present invention is described below.

When the following formula (9) is satisfied, specifically, when $|\beta m0|>|\beta s2|$ is satisfied, the light beams can be focused as lines by the second lens (the anamorphic lens 4) during propagation, and this makes it easy to make the relationship between the deflecting reflective surface of the polygon mirror 5 and the scanning surface 9 close to a conjugate relation.

$$|\beta m0|>|\beta s2| \text{ and } |\beta s0|>|\beta s2| \quad \text{(formula 9)}$$

In addition, when using multiple light sources, it is important to maintain the scanning line intervals in the sub scanning direction to be constant. When the relationship $|\beta m0|>|\beta s2|$ is satisfied, it is possible to maintain the scanning line intervals in the sub scanning direction to be constant.

Conversely, when the relationship $|\beta s0|>|\beta s2|$ is not satisfied, the focal length of the anamorphic lens 4 in the sub scanning direction becomes short, and this requires the anamorphic lens 4 and the polygon mirror 5 to be arranged close to each. However, if the anamorphic lens 4 and the polygon mirror 5 are too close, it is difficult to make an appropriate optical layout. In addition, due to the heat produced by the polygon mirror 5, the temperature of the anamorphic lens 4 rises, and this induces very large changes of the beam waist positions in the sub scanning direction. Further, when the focal length of the anamorphic lens 4 in the sub scanning direction becomes short, the opening of the aperture 3 in the sub scanning direction should be small for the purpose of beam shaping. However, when the opening of the aperture 3 in the sub scanning direction is too small, the amount of light becomes insufficient.

In addition, taken from formula 6, $|\beta m0|>|\beta s0|>|\beta s2|$. Due to this, the change of the beam waist position caused by power variation of the coupling lens 2 in the main scanning direction is large compared to the change of the beam waist position caused by power variation of the anamorphic lens 4 in the sub scanning direction.

In addition, it is preferable that the number of the light beams passing through the coupling lens 2 (the first lens) be less than the number of the light beams passing through the anamorphic lens 4 (the second lens). Due to this, it is possible to reduce influences of the wavelength differences between multiple light beams.

Especially, it is preferable that the number of the light beams passing through the first lens be one. In this case, there is no influence of the wavelength difference. Specifically, in the optical system shown in FIG. 1A, the coupling lens 2 (the first lens) and the anamorphic lens 4 (the second lens) can be lenses having diffracting surfaces.

When resin lenses are used in the first optical system and resin optical elements are used in the second optical system to lower the cost, to secure improvement of original optical performance due to the extended degree of freedom of the shape, and to maintain optical performance even when the temperature changes if it is desired to reduce the focus position shifts caused by temperature changes, the beam waist positions may change due to the differences of the wavelengths of the multiple light beams from plural light sources.

Usually, the wavelengths of the multiple light beams from plural light sources are different from each other by about 1 nm. Since on the directing surface, the refractive angle strongly depends on the wavelength, if the power of the directing surface is not appropriately selected, the focus positions of different light beams may shift, the diameters of the main beam spots may be different from each other, and this may cause degradation of image quality.

In this embodiment, by using resin lenses in the first optical system and the second optical system, while securing low cost and improvement of original optical performance due to the extended degree of freedom of the shape, good optical performance is obtained regardless of wavelength differences of the plural light beams.

In a laser diode light source, due to a temperature rise, the oscillation wavelength shifts to the long wavelength side, and this is one of the reasons causing the main scanning beam waist position shift.

In addition, there are other reasons as discussed below.

(1) due to homologous deformation caused by thermal expansion, the curvature radius of the refractive surface increases, and thus the focal length increases.

(2) due to the homologous deformation caused by a temperature rise, the focal length increases further on the refractive surface.

(3) due to homologous deformation caused by thermal expansion, the grating intervals on the diffracting surface increases, and thus the focal length increases.

The above (1) through (3) cause the focus position to shift toward the image plane side.

The above changes of the focal length should be canceled out by an increase of the light source wavelength. This is described specifically below.

Usually, it is necessary to anticipate a wavelength difference of the multiple light beams of the light sources to be 2 nm or so, for example, in a "+1 nm to −1 nm" range. In order that the diameter of the beam spot in the main scanning direction be within a depth (Wm) of the diameter of the beam spot in the main scanning direction on the scanning surface, it is preferable that the following formula 10 be satisfied.

$$|\Delta m'1 + \Delta m'2 + \Delta m'3| < Wm/2 \quad \text{(formula 10)}$$

where, assuming that in the first optical system, the change of the main-scanning beam waist position caused by the power variation of a refractive portion, when the light source wavelength increases by 1 nm, is represented by $\Delta m'1$, and the change of the main-scanning beam waist position caused by the power variation of a diffractive portion, when the light source wavelength increases by 1 nm, is represented by $\Delta m'2$; further, assuming that in the second optical system, the change of the main-scanning beam waist position caused by the power variation, when the light source wavelength increases by 1 nm, is represented by $\Delta m'3$, and the depth of the diameter of the main scanning beam on the scanning surface is represented by Wm.

Here, the depth Wm is defined to be a depth at which the diameter of the main scanning beam diameter decreases to 10% or less of the beam waist diameter, and the main scanning beam diameter is defined to correspond to light intensity equaling $1/e^2$ of the maximum intensity of the beam spot.

Considering changes of the refractive index and the shape of the refractive portion caused by the temperature variations, in order to reduce the influence of the wavelength differences between the multi light beams after correcting the beam spot position shift in the main scanning direction of the overall optical scanning system, it is necessary that the beam spot position shift of the overall optical system in the main scanning direction caused only by wavelength variations be less than 0. That is, the following formula 11 is satisfied.

$$\Delta m'1+\Delta m'2+\Delta m'3<0 \quad \text{(formula 11)}$$

When formula 11 is satisfied, it is possible to reduce the beam spot position shift of the overall optical system in the main scanning direction caused by the wavelength differences between the multi-light beams to a negligible level.

In the second optical system, because of shape expansion, a variation of the wavelength of the light source, and a change of the refractive index caused by a rise of the temperature, the main-scanning beam waist position shift $\Delta m3$ moves in a direction away from the deflector (this is referred to as "positive direction"). Especially, when a resin lens is used, $\Delta m3$ becomes very large.

Similarly, as for the refractive portion in the first optical system, because of shape expansion, a variation of the wavelength of the light source, and a change of the refractive index caused by a rise of the temperature, the main-scanning beam waist position shift $\Delta m1$ moves in a direction away from the deflector (this is, the positive direction).

In order that the power of the refractive portion in the first optical system be greater than zero, if the main-scanning beam waist position shift $\Delta m2$ caused by a rise of the temperature is set to be less than zero, a change of a distance between the light source and a main scanning front principal point, which is represented by $\Delta d1$, is set to be greater than zero, and the main-scanning beam waist position shift caused by the change of the distance ($\Delta d1$) is set to be less than zero, it is possible to reduce the main-scanning beam waist position shift of the overall optical system in the main scanning direction caused a temperature rise, which can be expressed as:

$$-\Delta d1\times(f2/f1)^2.$$

Specifically, it is preferable that the following formula 12 be satisfied.

$$\Delta m1+\Delta m2+\Delta m3-\Delta d1\times(f2/f1)^2<Wm/40 \quad \text{(formula 12)}$$

where, in the first optical system, the change of the main-scanning beam waist position caused by power variation of a refractive portion, when a temperature increases by 1° C., is represented by $\Delta m1$, and the change of the main-scanning beam waist position caused by power variation of a diffractive portion, when a temperature increases by 1° C., is represented by $\Delta m2$; and in the second optical system, the change of the main-scanning beam waist position caused by power variation, when a temperature increases by 1° C., is represented by $\Delta m3$, and the change of the distance between the light source and the main scanning front principal point, when a temperature increases by 1° C., is represented by $\Delta d1$; further, the focal length of the first optical system in the main scanning direction is represented by f1, and the focal length of the second optical system in the main scanning direction is represented by f2.

Here, similar to the above, the depth Wm is defined to be a depth at which the diameter of the main scanning beam decreases to 10% or less of the beam waist diameter, and the diameter of the main scanning beam is defined to correspond to the light intensity equaling $1/e^2$ of the maximum intensity of the beam spot.

Usually, since it is necessary to anticipate that the temperature rises by 20° C. at most in the optical scanning device, the upper limit of the left side of the formula 12, that is, the total main-scanning beam waist position shift, is Wm/(20×2). If the left side of the formula 12 is greater than the right side, the diameter of the beam spot in the main scanning direction is over the tolerable level, and in this case, image quality degradation occurs, which induces a degraded grade level and a degraded sharpness.

When resin lenses are used in the first optical system and resin optical elements are used in the second optical system to lower the cost, to secure improvement of original optical performance due to the extended degree of freedom of the shape, and to maintain optical performance even when the temperature changes if it is desired to reduce the focus position shifts caused by temperature changes, the beam waist positions may change due to the differences of the wavelengths of the multiple light beams from plural light sources.

As described above, usually, it is necessary to anticipate a wavelength difference of the multiple light beams of the light sources to be 2 nm or so, for example, in a "+1 nm to −1 nm" range. In order that the diameter of the beam spot in the sub scanning direction be within a depth (Ws) of the diameter of the beam spot in the sub scanning direction on the scanning surface, it is preferable that the following formula 13 be satisfied.

$$|\Delta s'1+\Delta s'2+\Delta s'3|<Ws/2 \quad \text{(formula 13)}$$

where in the first optical system, the change of the sub-scanning beam waist position caused by power variation of a refractive portion, when a wavelength of the light source increases by 1 nm, is represented by $\Delta s'1$, and the change of the sub-scanning beam waist position caused by power variation of a diffractive portion, when a wavelength of one of the light sources increases by 1 nm, is represented by $\Delta s'2$; and in the second optical system, the change of the main-scanning beam waist position caused by power variation, when a wavelength of one of the light sources increases by 1 nm, is represented by $\Delta s'3$, and the depth of the diameter of the sub scanning beam on the scanning surface is represented by Ws.

Considering changes of the refractive index and the shape of the refractive portion caused by the temperature variations, in order to reduce the influence of the wavelength differences between the multi light beams after correcting the beam spot position shift in the sub scanning direction of the overall optical scanning system, it is necessary that the beam spot position shift of the overall optical system in the sub scanning direction caused only by wavelength variations be less than 0. That is, the following formula 14 needs to be satisfied.

$$\Delta s'1+\Delta s'2+\Delta s'3<0 \quad \text{(formula 14)}$$

When formula 14 is satisfied, it is possible to reduce the beam spot position shift of the overall optical system in the main scanning direction caused by the wavelength difference between the multi light beams to a negligible level.

In the second optical system, because of shape expansion, a variation of the wavelength of the light source, and a change of the refractive index caused by a rise of the temperature, the sub-scanning beam waist position shift $\Delta s3$ moves in a direction away from the deflector (this is referred to as "positive direction"). Especially, when a resin lens is used, $\Delta s3$ becomes very large.

Similarly, as for the refractive portion in the first optical system, because of shape expansion, a variation of the wavelength of the light source, and a change of the refractive index caused by a rise of the temperature, the sub-scanning beam waist position shift $\Delta s1$ moves in a direction away from the deflector (this is, the positive direction).

In order that the power of the refractive portion in the first optical system be greater than zero, if the sub-scanning beam waist position shift Δs2 caused by a rise of the temperature is set to be less than zero, a change of a distance between the light source and a sub scanning front principal point, which is represented by Δd1, is set to be greater than zero, and the sub-scanning beam waist position shift caused by the change of the distance (Δd1), which is expressed to be $-\Delta d1 \times (\beta 1 \times \beta 2)^2$, is set to be less than zero, it is possible to reduce the main-scanning beam waist position shift of the overall optical system in the main scanning direction causes a rise of the temperature, which can be expressed as:

$$\Delta s1 + \Delta s2 + \Delta s3 - \Delta d1 * (\beta 1 * \beta 2)^2.$$

Specifically, it is preferable that the following formula 15 be satisfied.

$$\Delta s1 + \Delta s2 + \Delta s3 - \Delta d1 \times (\beta 1 \times \beta 2)^2 < Ws/40 \qquad \text{(formula 15)}$$

where, in the first optical system, the change of the sub-scanning beam waist position caused by power variation of a refractive portion, when a temperature increases by 1° C., is represented by Δs1, the change of the sub-scanning beam waist position caused by power variation of a diffractive portion, when a temperature increases by 1° C., is represented by Δs2; and in the second optical system, the change of the sub-scanning beam waist position caused by power variation, when a temperature increases by 1° C., is represented by Δs3; further, the magnification of the first optical system in the sub scanning direction is represented by β1, and the magnification of the second optical system in the sub scanning direction is represented by β2.

If the left side of the formula 15 is greater than the right side, the diameter of the beam spot in the sub scanning direction is over the tolerable level, and in this case, image quality degradation occurs, which induces a degraded grade level and a degraded sharpness.

In addition, in a multi-beam scanning optical system, the light emission spot group is rotated to fine adjust the sub scanning beam pitch. However, by this method, along with adjustment of the sub scanning beam pitch, the positions of lenses in the first optical system in the main scanning beam direction change. In order to minimize optical performance variation caused by the position change in the main scanning beam direction, it is preferable that the cross-sectional shape of the diffracting surface of the coupling lens in the sub scanning direction be the same regardless of the position of the cross section of the diffracting surface in the main scanning direction. Due to this, it is possible to minimize the optical performance variation even when the light emission spot group is not rotated, but the position on lenses in the first optical system in the main scanning beam direction changes due to attachment errors.

In addition, in the multi-beam optical system of the present embodiment, light beams from the light sources 1, 1a having different positions in the sub scanning direction enter into the coupling lenses 2, 2a, and are converted into nearly parallel light beams by the coupling lenses 2 and 2a. The nearly parallel light beams propagate through the aperture 3, which limits the widths of the light beams in the sub scanning direction, and then enter into the anamorphic lens 4 (the second lens) having a diffracting surface. On the diffracting surface of the anamorphic lens 4, the grating intervals become small at positions far away from the optical axis. From the point of view of fabrication, it is difficult to maintain the optical performance at the positions, where the grating intervals become small.

In order to maintain the optical performance, it is preferable that the incident light beams enter into the anamorphic lens 4 near the optical axis.

Figure 5A:
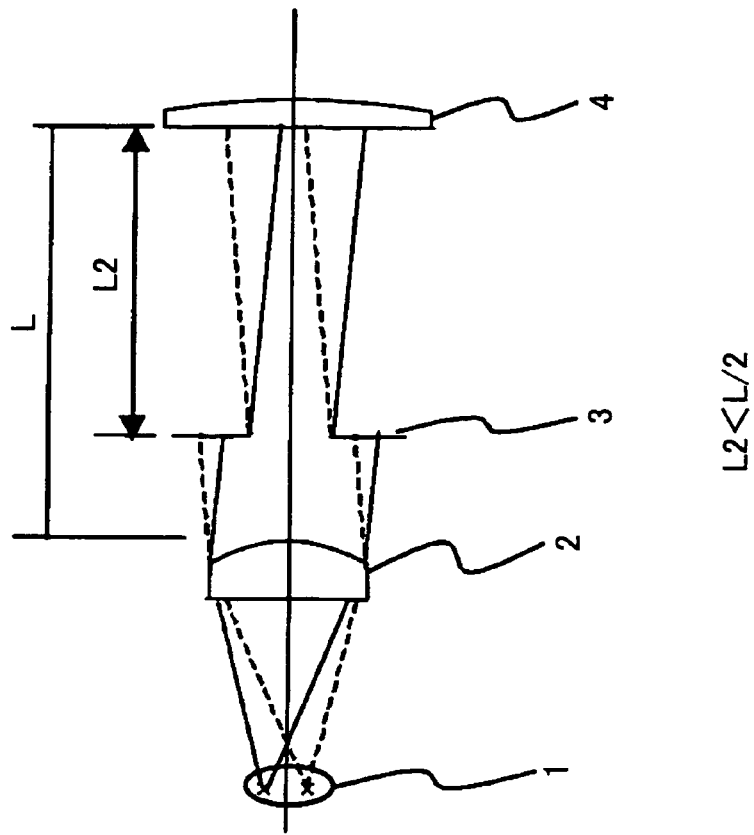
FIG. 5A and FIG. 5B are schematic cross-sectional views illustrating the multi-beam scanning optical apparatus of the present embodiment.
Figure 5B:
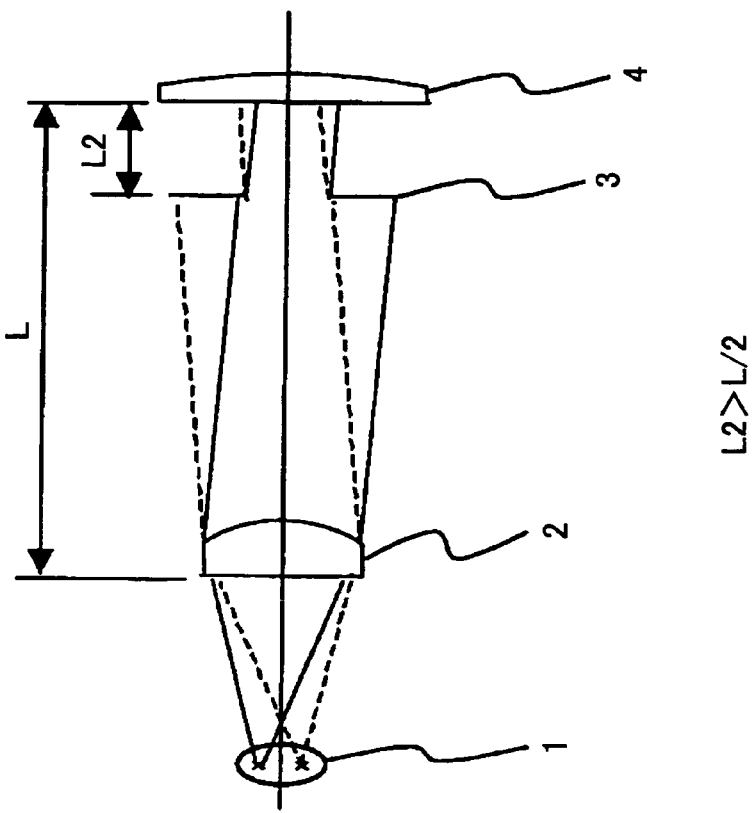

FIG. 5A and FIG. 5B are schematic cross-sectional views illustrating the multi-beam scanning optical apparatus of the present embodiment.

As shown in FIG. 5A and FIG. 5B, assuming the distance between the coupling lens 2 (the first lens) and the anamorphic lens 4 (the second lens) is represented by L, and the distance between the aperture 3 and the anamorphic lens 4 (the second lens) is represented by L2, then the distance L1 between the coupling lens 2 (the first lens) and the aperture 3 equals L-L2.

In order that the incident light beams enter into the anamorphic lens 4 near the optical axis, it is preferable that L2<L/2.

When L2 is greater than L/2, degradation of the optical performance becomes so large as to exceed the tolerable level.

Below, examples of the optical scanning device as shown in FIG. 1A are presented.

EXAMPLE 1

The wavelength of the light source 1 is 655 nm at a temperature of 25° C., and 659 nm at a temperature of 45° C.

The surface shape of the coupling lens 2 is described below.

The surface shape of the coupling lens 2 on the light source side is a diffracting surface constituted by a concentric grating.

The phase function φ(h) of the diffracting surface is expressed as the following formula 16.

$$\phi(h) = C1 \cdot h^2 \qquad \text{(formula 16)}$$

where h represents a distance from the optical axis, and C1 represents a phase coefficient.

The value of the phase coefficient C1 is as below.

$$C1 = -1.127E-02$$

The surface shape of the coupling lens 2 on the image side is also an aspheric surface as described by the above formula 1, and the values of the parameters R, K, A4, A6, A8, A10, which express the surface shape of the coupling lens on the light source side are as follows.

R=−34.32865
K=−71.517137
A4=−0.208422E−03
A6=0.651475E−05
A8=−0.238199E−06
A10=0.770435E−08.

The surface shape of the second lens (anamorphic lens 4) is described below.

The surface shape of the anamorphic lens 4 on the light source side is a plane in the main scanning direction and is a non-circular arc as described by the following formula 17 in the sub scanning direction.

$$x = (z^2/Rs)/[1+\sqrt{\{1-(1+K)(z/Rs)^2\}}] + B4 \cdot z^4 + B6 \cdot z^6 + B8 \cdot z^8 + B10 \cdot z^{10} \qquad \text{(formula 17)}$$

where z represents a distance in the sub scanning direction from the optical axis, Rs represents the curvature radius in the sub scanning direction near the optical axis, K represents the conic constant, A4, A6, A8, A10 are high-order coefficients, and x represents the depth in the optical axis.

Specifically, values of the above parameters expressing the surface shape of the anamorphic lens 4 on the light source side are as follows.

Rs=−54.46507
K=−0.072542
B4=0.577350E−07
B6=0.474038E−07
B8=−0.190253E−07
B10=0.247352E−08

The surface shape of the anamorphic lens 4 on the image side is a diffracting surface having a grating in the sub scanning direction.

The phase function $\phi(z)$ of the diffracting optical surface is expressed as the following formula 18.

$$\phi(z) = C2 \cdot z^2 \quad \text{(formula 18)}$$

where z represents a distance from the optical axis in the sub scanning direction, and C2 represents a phase coefficient.

The value of the phase coefficient C2 is below.

$$C2 = -8.8148E-03$$

The surface shape (lens form) of the deflector-side scanning lens 6 is described below.

In the main scanning direction, the surface shape of the deflector-side scanning lens 6 on the light source side is a non-circular arc, as described by the following formula 19.

$$x = (y^2/Rs)/[1+\sqrt{1-(1+K)(y/Rs)^2}] + A4 \cdot y^4 + A6 \cdot y^6 + A8 \cdot y^8 + A10 \cdot y^{10} \quad \text{(formula 19)}$$

where y represents a distance from the optical axis in the main scanning direction, Rm represents the curvature radius in the main scanning direction near the optical axis, K represents the conic constant, A4, A6, A8, A10 are high-order coefficients, and x represents the depth in the optical axis direction.

In the sub scanning direction, the surface shape of the deflector-side scanning lens 6 on the light source side is described by the following formula 20, in which the curvature radius in the sub scanning direction (that is, the curvature radius in the cross section in the sub scanning direction) varies continuously along the main scanning direction.

$$Cs(Y) = 1/Rs(0) + B1 \cdot Y + B2 \cdot Y^2 + B3 \cdot Y^3 + B4 \cdot Y^4 + B5 \cdot Y^5 \quad \text{(formula 20)}$$

where y represents a distance from the optical axis in the main scanning direction, Cs(y) represents the curvature radius in the sub scanning direction at a distance y from the optical axis in the sub scanning direction, and B1, B2, B3, B4, B5 are high-order coefficients.

Specifically, values of the above parameters expressing the surface shape of the deflector-side scanning lens 6 on the light source side are as follows.

Rm=−279.9, Rs=−61.0
K=−2.900000E+01
A4=1.755765E−07
A6=−5.491789E−11
A8=1.087700E−14
A10=−3.183245E−19
A12=−2.635276E−24
B1=−2.066347E−06
B2=5.727737E−06
B3=3.152201E−08
B4=2.280241E−09
B5=−3.729852E−11
B6=−3.283274E−12
B7=1.765590E−14
B8=1.372995E−15
B9=−2.889722E−18
B10=−1.984531E−19.

The surface shape of the deflector-side scanning lens 6 on the image side is an aspheric surface as described by the above formula 1, and the values of the parameters R, K, A4, A6, A8, A10, which express the surface shape of the deflector-side scanning lens 6 on the light source side are as follows.

R=−83.6
K=−0.549157
A4=2.748446E−07
A6=−4.502346E−12
A8=−7.366455E−15
A10=1.803003E−18
A12=2.727900E−23.

The surface shape (lens form) of the image-plane side scanning lens 7 is described below.

In the main scanning direction, the surface shape of the image-plane side scanning lens 7 on the light source side is a non-circular arc, as described by the above formula 19, and in the sub scanning direction, the surface shape of the image-plane side scanning lens 7 on the light source side is described by the above formula 20, in which the curvature radius in the sub scanning direction (that is, the curvature radius in the cross section in the sub scanning direction) varies continuously along the main scanning direction.

Specifically, values of the above parameters expressing the surface shape of the image-plane side scanning lens 7 on the light source side are as follows.

Rm=6950, Rs=110.9
K=0.000000E+00
A4=1.549648E−08
A6=1.292741E−14
A8=−8.811446E−18
A10=−9.182312E−22
B1=−9.593510E−07
B2=−2.135322E−07
B3=−8.079549E−12
B4=2.390609E−12
B5=2.881396E−14
B6=3.693775E−15
B7=−3.258754E−18
B8=1.814487E−20
B9=8.722085E−23
B10=−1.340807E−23.

In the main scanning direction, the surface shape of the image-plane side scanning lens 7 on the image side is a non-circular arc, as described by the above formula 19, and in the sub scanning direction, the surface shape of the image-plane side scanning lens 7 on the image side is described by the above formula 20, in which the curvature radius in the sub scanning direction (that is, the curvature radius in the cross section in the sub scanning direction) varies continuously along the main scanning direction.

Specifically, values of the above parameters expressing the surface shape of the image-plane side scanning lens 7 on the image side are as follows.

Rm=766, Rs=−68.22
K=0.000000E+00
A4=−1.150396E−07
A6=1.096926E−11
A8=−6.542135E−16
A10=1.984381E−20
A12=−2.411512E−25
B2=3.644079E−07
B4=−4.847051E−13
B6=−1.666159E−16
B8=4.534859E−19
B10=−2.819319E−23

Distances d1 through d10 as shown in FIG. 1A indicate the distances between surfaces of the lenses, that is, surface intervals. For example, the surface intervals d1 through d10 take the following values (in mm).

d1=26.07144
d2=3.8
d3=102.8
d4=3.0
d5=121.7448
d6=64.007
d7=22.6
d8=75.85
d9=4.9
d10=158.71

The wavelength of the semiconductor laser (light source) 1 is 655 nm at a temperature of 25° C., and 659 nm at a temperature of 45° C. Both of the dustproof glass 8 and the soundproof glass 10 are formed from glass which is 1.9 mm thick at 25° C. The refractive index of the glass forming the dustproof glass 8 and the soundproof glass 10 is 1.514371 at the wavelength of 655 nm and at a temperature of 25° C., is 1.514291 at the wavelength of 659 nm and at a temperature of 45° C., and 1.514327 at the wavelength of 656 nm and at a temperature of 25° C., and the linear expansion coefficient is $7.5E{-}06K^{-1}$.

All the lenses are formed from the same resin. The refractive index of the resin is 1.527257 at the wavelength of 655 nm and at the temperature of 25° C., 1.525368 at the wavelength of 659 nm and at the temperature of 45° C., and 1.527222 at the wavelength of 656 nm and at the temperature of 25° C., and the linear expansion coefficient is $7.0E{-}05K^{-1}$.

The light source 1 and the coupling lens 2 are fixed on the same base member 11, and the base member 11 is made from aluminum. The linear expansion coefficient of the base member 11 is $4.0E{-}05K^{-1}$.

EXAMPLE 2

The wavelength of the light source 1 is 655 nm at a temperature of 25° C., and 659 nm at a temperature of 45° C.

The first lens (the coupling lens 2) is formed from glass. The surface shape of the coupling lens 2 is described below.

The surface shape of the coupling lens 2 on the light source side is a plane.

The surface shape of the coupling lens 2 on the image side is an aspheric surface as described by the above formula 1. The curvature radius near the optical axis R takes the following value.

$R=-18.49$.

Parameters K, A4 and others are optimized to correct wave aberrations.

The surface shape of the second lens (anamorphic lens 4) is described below.

The surface shape of the anamorphic lens 4 on the light source side is a toroidal surface, and the surface shape of the anamorphic lens 4 on the image side is an ellipsoidal diffracting surface with a planar reference plane.

The values of parameters expressing the surface shape of the anamorphic lens 4 on the light source side are as follows.

$Rm=-246.5, Rs=-52.2$ where Rm represents the curvature radius in the main scanning direction, and Rs represents the curvature radius in the sub scanning direction.

As for the surface shape of the anamorphic lens 4 on the image side, the phase function $\phi(y, z)$ of the diffracting surface is expressed as the following formula 21.

$$\phi(y,z)=C3 \cdot y^2 + C4 \cdot z^2 \quad \text{(formula 21)}$$

where y represents a distance from the optical axis in the main scanning direction, z represents a distance from the optical axis in the sub scanning direction, and C3, C4 represent phase coefficients.

The values of the phase coefficients C3, C4 are as below.

$C3=-0.009027, C4=-0.001065$

The distances d1 through d10 as shown in FIG. 1A (surface interval) take the following values (in mm).

d1=24.25
d2=4.5
d3=61.71
d4=3.0
d5=121.7448(124.9)
d6=64.00685
d7=22.6
d8=75.85
d9=4.9
d10=158.71

Data of the lenses subsequent to the polygon mirror are the same as those in the first example.

Specifically, both of the dustproof glass 8 and the soundproof glass 10 are formed from glass which is 1.9 mm thick at 25° C. The refractive index of the glass forming the dustproof glass 8 and the soundproof glass 10 is 1.514371 at the wavelength of 655 nm and at a temperature of 25° C., is 1.514291 at the wavelength of 659 nm and at a temperature of 45° C., and 1.514327 at the wavelength of 656 nm and at a temperature of 25° C.; and the linear expansion coefficient is $7.5E{-}06K^{-1}$.

The lenses except for the coupling lens 2 are formed from the same resin. The refractive index of the resin is 1.527257 at the wavelength of 655 nm and at the temperature of 25° C., 1.525368 at the wavelength of 659 nm and at the temperature of 45° C., and 1.527222 at the wavelength of 656 nm and at the temperature of 25° C.; and the linear expansion coefficient is $7.0E{-}05K^{-1}$.

The coupling lens 2 is formed from glass. The refractive index of the glass is 1.689631 at the wavelength of 655 nm and at the temperature of 25° C., 1.689528 at the wavelength of 659 nm and at the temperature of 45° C., and 1.689581 at the wavelength of 656 nm and at the temperature of 25° C.; and the linear expansion coefficient is $7.5E{-}06K^{-1}$.

The light source 1 and the coupling lens 2 are fixed on the same base member 11, and the base member 11 is made from aluminum. The linear expansion coefficient of the base member 11 is $2.3E{-}05K^{-1}$.

EXAMPLE 3

The wavelength of the light source 1 is 655 nm at a temperature of 25° C., and 659 nm at a temperature of 45° C.

The first lens (the coupling lens 2) is formed from glass. The surface shape of the coupling lens 2 is described below.

The surface shape of the coupling lens 2 on the light source side is a plane.

The surface shape of the coupling lens 2 on the image side is an aspheric surface as described by the above formula 1. Parameters are optimized to correct wave aberrations. Specifically, the curvature radius near the optical axis R takes the following value.

$R=-18.49$.

The surface shape of the second lens (anamorphic lens 4) is described below.

The surface shape of the anamorphic lens 4 on the light source side includes a concentric grating with a rotational symmetric spherical surface as a reference surface.

The curvature radius of the reference surface is −246.5.

The diffracting surface includes a concentric grating. The phase function φ(h) of the diffracting surface is expressed as the following formula 22.

$$\phi(h)=C1 \cdot h^2 \quad \text{(formula 22)}$$

where h represents a distance from the optical axis, and C1 represents a phase coefficient. The value of the phase coefficient C1 is as below.

$$C1=-0.00107$$

The surface shape of the anamorphic lens 4 on the image side is a diffracting surface having a grating in the sub scanning direction with a cylindrical surface as a reference surface. The cylindrical surface has power in the sub scanning direction, and the curvature radius in the sub scanning direction is 69.16.

The phase function φ(z) of the diffracting optical surface is expressed as the above formula 18, and the value of the phase coefficient C2 is:

$$C2=-0.001069$$

The distances d1 through d10 as shown in FIG. 1A (surface interval) take the following values (in mm).
d1=24.25
d2=4.5
d3=61.71
d4=3.0
d5=121.7448(124.9)
d6=64.00685
d7=22.6
d8=75.85
d9=4.9
d10=158.71

Data of the lenses subsequent to the polygon mirror are the same as those in the first example.

Specifically, both of the dustproof glass 8 and the soundproof glass 10 are formed from glass which is 1.9 mm thick at 25° C. The refractive index of the glass forming the dustproof glass 8 and the soundproof glass 10 is 1.514371 at the wavelength of 655 nm and at a temperature of 25° C., is 1.514291 at the wavelength of 659 nm and at a temperature of 45° C., and 1.514327 at the wavelength of 656 nm and at a temperature of 25° C.; and the linear expansion coefficient is 7.5E−06K$^{-1}$.

The lenses except for the coupling lens 2 are formed from the same resin. The refractive index of the resin is 1.527257 at the wavelength of 655 nm and at the temperature of 25° C., 1.525368 at the wavelength of 659 nm and at the temperature of 45° C., and 1.527222 at the wavelength of 656 nm and at the temperature of 25° C.; and the linear expansion coefficient is 7.0E−0.5K$^{-1}$.

The coupling lens 2 is formed from glass. The refractive index of the glass is 1.689631 at the wavelength of 655 nm and at the temperature of 25° C., 1.689528 at the wavelength of 659 nm and at the temperature of 45° C., and 1.689581 at the wavelength of 656 nm and at the temperature of 25° C.; and the linear expansion coefficient is 7.5E−06K$^{-1}$.

The light source 1 and the coupling lens 2 are fixed on the same base member 11, and the base member 11 is made from aluminum. The linear expansion coefficient of the base member 11 is 2.3E−05K$^{-1}$.

Behavior of light beam diameters near the scanning surface (depth characteristics) of the above examples 1 through 3 are illustrated in FIG. 6A and FIG. 6B, FIG. 7A and FIG. 7B, and FIG. 8A and FIG. 8B, respectively.

Figure 6A:
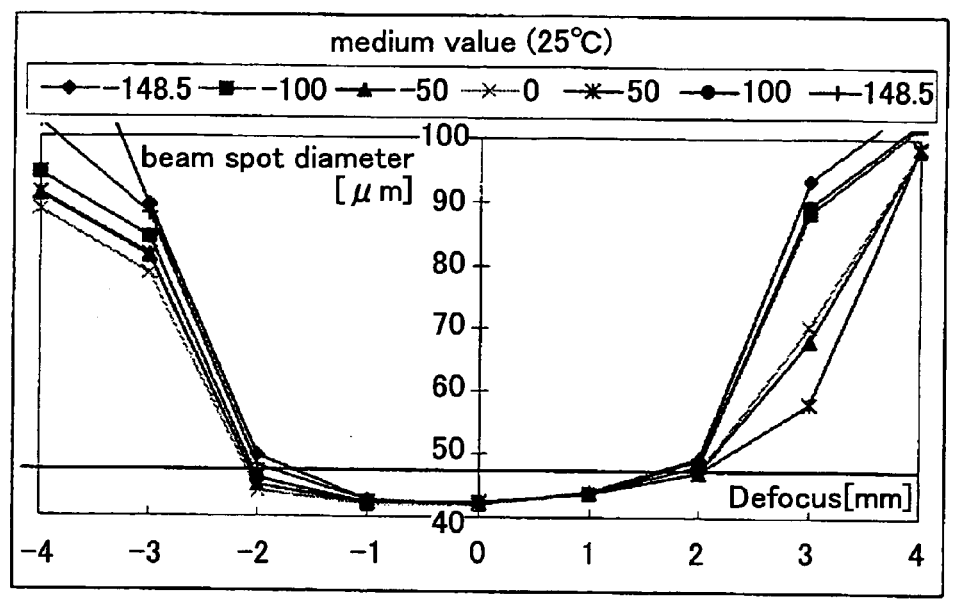
FIG. 6A and FIG. 6B are graphs illustrating light beam diameters near the scanning surface of the example 1, where.
Figure 6B:
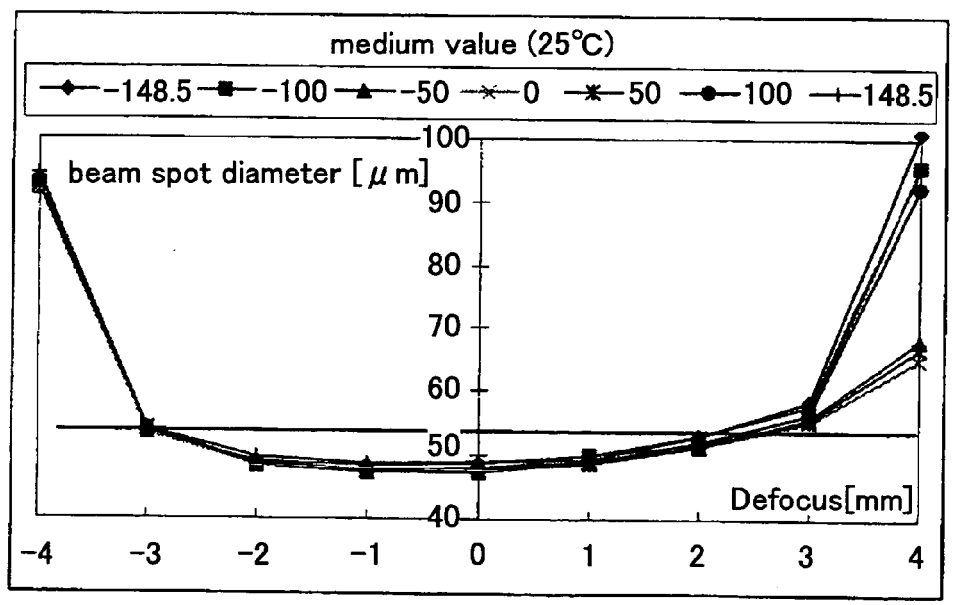

FIG. 6A and FIG. 6B are graphs illustrating light beam diameters near the scanning surface of the example 1, where, FIG. 6A shows the light beam diameters in the main scanning direction, and FIG. 6B shows the light beam diameters in the sub scanning direction.

In FIG. 6A and FIG. 6B, the abscissa indicates the magnitude of defocusing when the light beam is defocused on the scanning surface, and the ordinate indicates the corresponding beam spot diameter on the scanning surface. Thus, when the abscissa equals zero, the data points indicate the beam waist diameter. The solid line parallel to the abscissa corresponds to a beam spot diameter equaling 110% of the beam waist diameter, and the portion of the ordinate below the solid line corresponds to depths Wm or Ws.

Figure 7A:
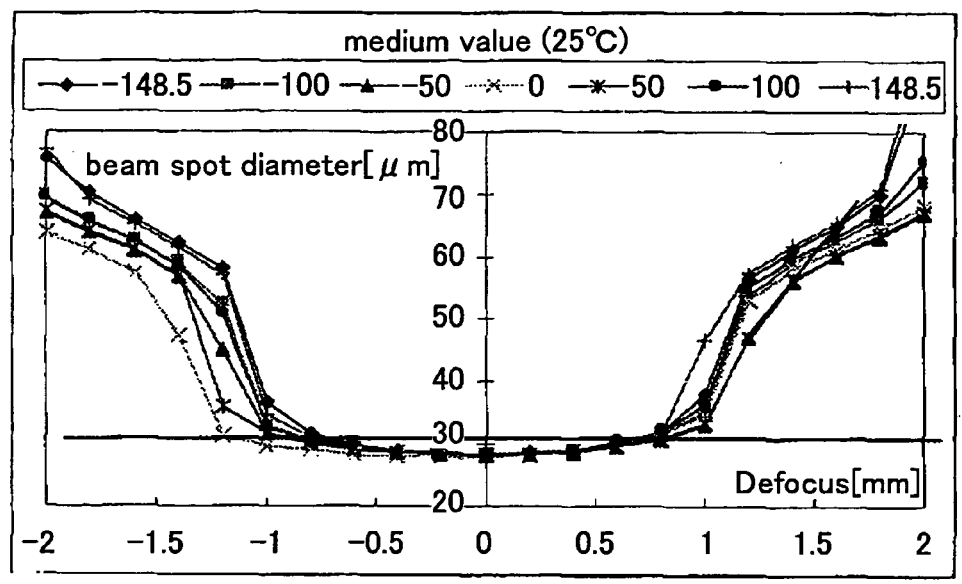
FIG. 7A and FIG. 7B are graphs illustrating light beam diameters near the scanning surface of the example 2, where.
Figure 7B:
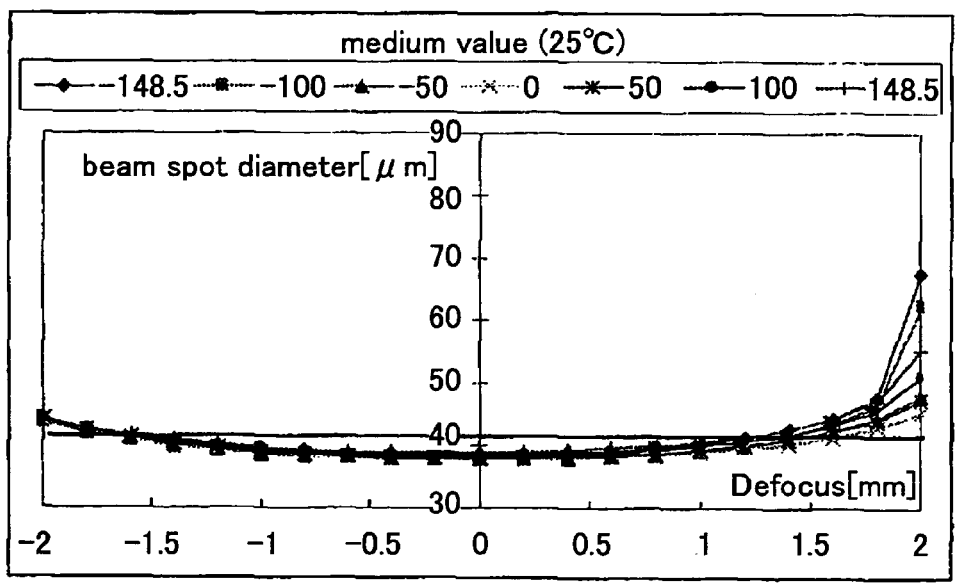

FIG. 7A and FIG. 7B are graphs illustrating light beam diameters near the scanning surface of the example 2, where, FIG. 7A shows the light beam diameters in the main scanning direction, and FIG. 7B shows the light beam diameters in the sub scanning direction.

Similarly, in FIG. 7A and FIG. 7B, the abscissa indicates the magnitude of defocusing when the light beam is defocused on the scanning surface, and the ordinate indicates the corresponding beam spot diameter on the scanning surface. Thus, when the abscissa equals zero, the data points indicate the beam waist diameter. The solid line parallel to the abscissa corresponds to a beam spot diameter equaling 110% of the beam waist diameter, and the portion of the ordinate below the solid line corresponds to depths Wm or Ws.

Figure 8A:
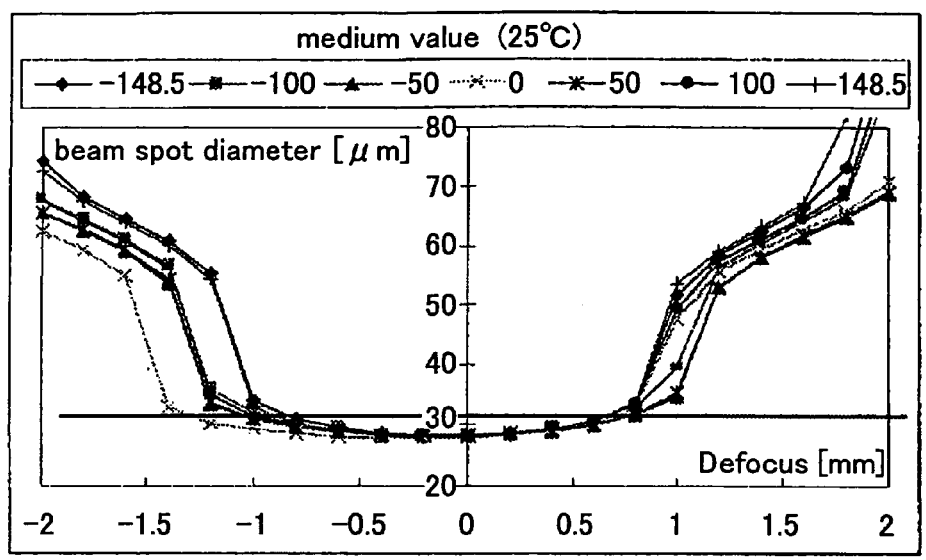
FIG. 8A and FIG. 8B are graphs illustrating light beam diameters near the scanning surface of the example 3, where.
Figure 8B:
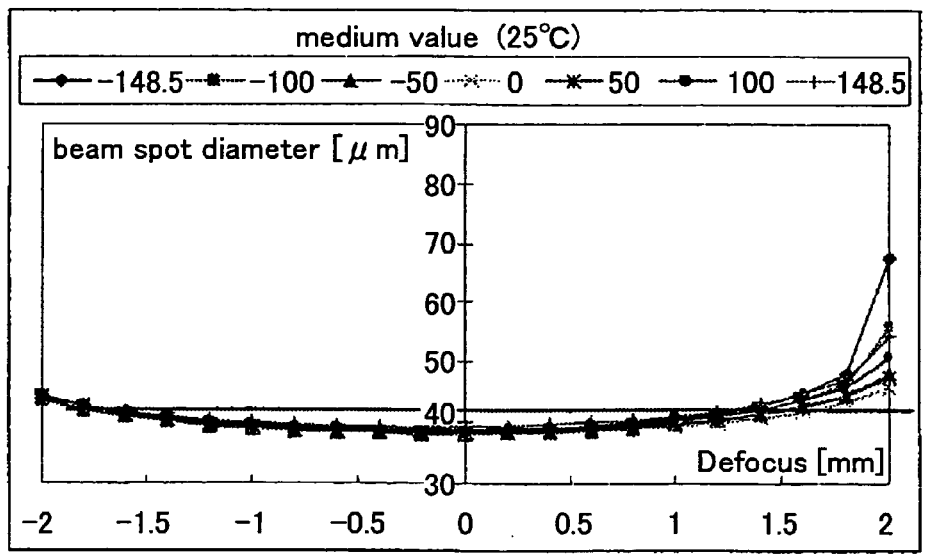

FIG. 8A and FIG. 8B are graphs illustrating light beam diameters near the scanning surface of the example 3, where, FIG. 8A shows the light beam diameters in the main scanning direction, and FIG. 8B shows the light beam diameters in the sub scanning direction.

Similarly, in FIG. 8A and FIG. 8B, the abscissa indicates the magnitude of defocusing when the light beam is defocused on the scanning surface, and the ordinate indicates the corresponding beam spot diameter on the scanning surface. Thus, when the abscissa equals zero, the data points indicate the beam waist diameter. The solid line parallel to the abscissa corresponds to a beam spot diameter equaling 110% of the beam waist diameter, and the portion of the ordinate below the solid line corresponds to depths Wm or Ws.

FIG. 9 is a table summarizing measured values of the parameters described above in examples 1 through 3, and results indicating whether formulae (6), (7), and (9) are satisfied.

FIG. 10 is another table summarizing other measured values of the parameters described above in examples 1 through 3. For clarity, the three examples shown in FIG. 10 are referred to as "example 1" (the same as that in FIG. 9), "example 4", and "example 5", respectively.

Note that formulae (6), (7), (9), (11), (12), (13), (15) correspond to the relations (1), (2), (4), (6), (7), (8), (10) in claims, respectively.

According to the results in the table in FIG. 8, all of examples 1, 2, 3, 4 and 5 satisfy the required conditions, and give good optical performance even when temperature variations occur.

Figure 11:
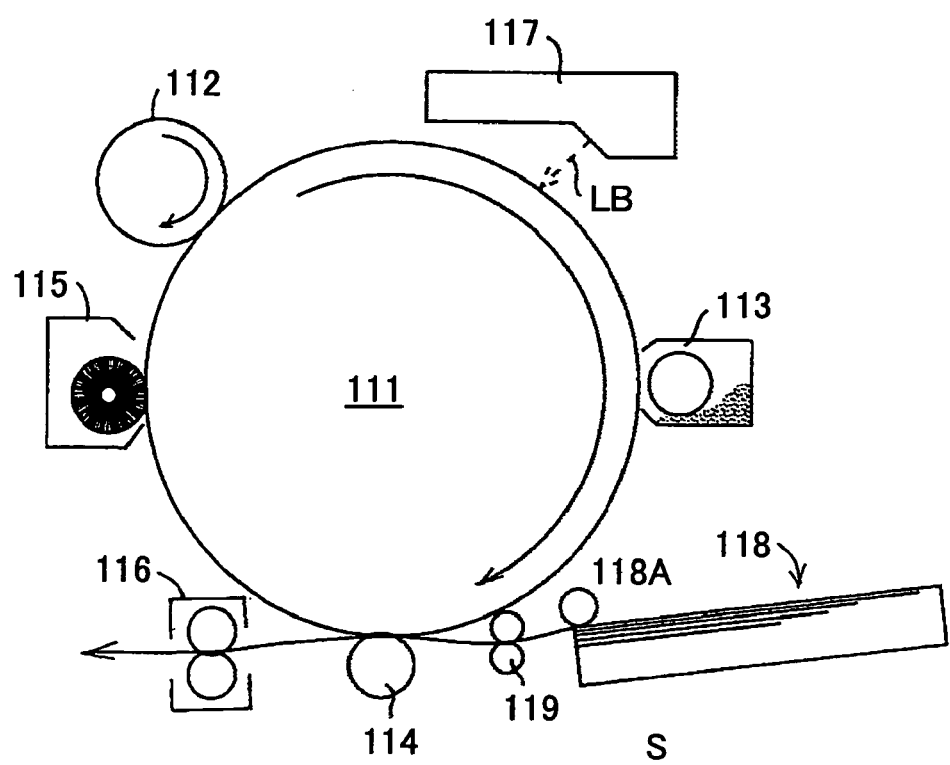
FIG. 11 is a schematic view illustrating a configuration of an image forming apparatus according an embodiment of the present invention.

FIG. 11 is a schematic view illustrating a configuration of an image forming apparatus according an embodiment of the present invention.

Here, a laser printer is used as an example of the image forming apparatus.

The laser printer shown in FIG. 8 includes a photoconductive medium 111, which is a cylindrical photoconductor. Around the photoconductive medium 111, there are a charging roller 112 serving as a charging unit, a developing unit 113, a transfer roller 114, and a cleaning unit 115. The charging roller 112 may be a corona charger.

In addition, an optical scanning unit 117 for scanning a laser beam LB is provided to perform exposure for writing between the charging roller 112 and the developing unit 113.

In addition, the laser printer shown in FIG. 8 further includes a fusing unit 116, a cassette 118, a resist roller pair 119, a paper feeding roller 118A, and transfer paper S serving as a recording medium.

When forming an image, the photoconductive medium 111, that is, the photoconductor, rotates in the clock-wise direction at a constant speed, the surface of the photoconductive medium 111 is charged uniformly by the charging roller 112, the laser beam LB from the optical scanning unit 117 is exposed on the surface of the photoconductive medium 111 for writing, and a latent image is formed thereon. The latent image is a so-called "negative latent image", that is, the image portion is exposed. The latent image is developed by reversal development, and a toner image is formed on the photoconductive medium 111, which acts as an image carrier.

The cassette 118, in which the transfer paper S is accommodated, is detachably attached to the main body of the image forming apparatus. In FIG. 8, the cassette 118 is attached to the image forming apparatus. The uppermost piece of paper S in the cassette 118 is fed by the paper feeding roller 118A, and the end of the paper S is held by the resist roller pair 119. The resist roller pair 119 conveys the paper S to a transferring section at the timing when the toner image on the photoconductive medium 111 is moved to a position for transferring. The conveyed paper S is overlapped with the toner image in the transferring section, and the transfer roller 114 transfers the toner image to the paper S by electrostatic image transfer. The paper S with the toner image thereon is sent to the fusing unit 116, and the fusing unit 116 fuses the toner image and delivers the paper S out of the device. After the toner image is transferred, the photoconductive medium 111 is cleaned by the cleaning unit 115 to remove residual toner or paper powder.

It should be noted that instead of the paper S, an OHP sheet for use in an overhead projector can also be used; in addition, transfer of the toner image can be performed through an intermediate transfer medium, such as an intermediate transfer belt.

According to the present embodiment, by using the optical scanning devices shown in examples 1 through 3 for the optical scanning unit 117, it is possible to form images of good quality.

The image forming apparatus in FIG. 9 is used for forming monochromatic images. Certainly, the present invention can also be applied to other well-known image forming apparatuses, such as a tandem-type multi-color image forming apparatus.

While the present invention is described with reference to specific embodiments chosen for purpose of illustration, it should be apparent that the invention is not limited to these embodiments, but numerous modifications could be made thereto by those skilled in the art without departing from the basic concept and scope of the invention.

This patent application is based on Japanese Priority Patent Applications No. 2005-306170 filed on Oct. 20, 2005, and No. 2006-075271 filed on Mar. 17, 2006, the entire contents of which are hereby incorporated by reference.

What is claimed is:

1. A multi-beam optical scanning device, comprising:
a plurality of light sources;
a deflection unit configured to deflect a plurality of light beams from the light sources;
a first optical system configured to guide the light beams from the light sources to the deflection unit; and
a second optical system configured to guide the light beams deflected by the deflection unit to a scanning surface;,
wherein
the first optical system includes
a first lens that couples the light beams from the light sources, and
a second lens that guides the light beams from the first lens to the deflection unit, said second lens being an anamorphic element having power at least in a sub scanning direction,
at least the second lens includes a diffracting surface having a power, and
assuming a magnification in a main scanning direction of a whole optical system of the multi-beam optical scanning device is represented by $\beta m0$, a magnification in the sub scanning direction of the whole optical system of the multi-beam optical scanning device is represented by $\beta s0$, and a magnification in the sub scanning direction of the second optical system is represented by $\beta s2$, the following relation (1) is satisfied:

$$|\beta m0|>|\beta s0|, \text{ and } |\beta s0|>|\beta s2| \qquad (1), \text{ and}$$

assuming the power of the diffracting surface of the first lens in the main scanning direction is represented by P1m, the power of the diffracting surface of the first lens in the sub scanning direction is represented by P1s, and the power of the diffracting surface of the second lens in the sub scanning direction is represented by P2s, the following relation (2) is satisfied:

$$|P2s|>|P1m|, \text{ and } |P2s|>|P1s| \qquad (2).$$

2. The multi-beam optical scanning device as claimed in claim 1, wherein a cross-sectional shape of the diffracting surface of the second lens in the sub scanning direction is the same regardless of a position of the cross section of the diffracting surface in the main scanning direction.

3. The multi-beam optical scanning device as claimed in claim 2, further comprising:
a housing to which the deflection unit, the second lens, and the second optical system are attached;
wherein
the second lens is attached to the housing directly, and
a contacting position between the second lens and the housing is near an optical axis of the second lens in the sub scanning direction.

4. The multi-beam optical scanning device as claimed in claim 1, wherein
an aperture is provided between the first lens and the second lens for limiting widths of the light beams at least in the sub scanning direction, and
assuming a distance between the first lens and the aperture is represented by L1, and a distance between the aperture and the second lens is represented by L2, the following relation is satisfied:

L1>L2.

5. The multi-beam optical scanning device as claimed in claim 1, wherein assuming a focal length of the first lens is represented by f1, and a distance between the first lens and the second lens is represented by L3, the following relation (3) is satisfied:

$$f1/2 < L3 < 3*f1/2 \quad (3).$$

6. The multi-beam optical scanning device as claimed in claim 1, wherein the light beams propagating toward the second lens are being condensed, and incident angles of the light beams incident on the diffracting surface of the second lens are substantially equal to each other.

7. A multi-beam optical scanning device, comprising:
a plurality of light sources;
a deflection unit configured to deflect a plurality of light beams from the light sources;
a first optical system including
a first lens that has a diffracting surface with a power and couples the light beams from the light sources;
a second lens that guides the light beams from the first lens to the deflection unit, said second lens being an anamorphic element having a diffracting surface with a power at least in a sub scanning direction; and
a second optical system configured to guide the light beams deflected by the deflection unit to a scanning surface;
wherein
assuming a magnification in a main scanning direction of a whole optical system of the multi-beam optical scanning device is represented by βm0, a magnification in the sub scanning direction of the whole optical system of the multi-beam optical scanning device is represented by βs0, and a magnification in the sub scanning direction of the second optical system is represented by βs2, the following relation (4) is satisfied:

$$|\beta m0| > |\beta s2|, \text{ and } |\beta s0| > |\beta s2| \quad (4), \text{ and}$$

a number of the light beams passing through the first lens is less than a number of the light beams passing through the second lens.

8. The multi-beam optical scanning device as claimed in claim 7, wherein the number of the light beams passing through the first lens is one.

9. The multi-beam optical scanning device as claimed in claim 7, wherein
the second optical system includes at least one optical element formed from a resin, and
assuming that
in the first optical system, a change of a position of a main-scanning beam waist caused by power variation of a refractive portion, when a wavelength of one of the light sources increases by 1 nm, is represented by Δm'1, and a change of a position of the main-scanning beam waist caused by power variation of a diffractive portion, when a wavelength of one of the light sources increases by 1 nm, is represented by Δm'2,
in the second optical system, a change of a position of a main-scanning beam waist caused by power variation, when a wavelength of one of the light sources increases by 1 nm, is represented by Δm'3, and
a depth of a diameter of the main scanning beam on the scanning surface is represented by Wm,
the following relation (5) is satisfied:

$$|\Delta m'1 + \Delta m'2 + \Delta m'3| < Wm/2 \quad (5).$$

10. The multi-beam optical scanning device as claimed in claim 9, wherein the following relation (6) is satisfied:

$$\Delta m'1 + \Delta m'2 + \Delta m'3 < 0 \quad (6).$$

11. The multi-beam optical scanning device as claimed in claim 10, wherein
assuming that
in the first optical system, a change of a position of a main-scanning beam waist caused by power variation of a refractive portion, when a temperature increases by 1° C., is represented by Δm1, and a change of a position of the main-scanning beam waist caused by power variation of a diffractive portion, when a temperature increases by 1° C., is represented by Δm2,
in the second optical system, a change of a position of a main-scanning beam waist caused by power variation, when a temperature increases by 1° C., is represented by Δm3,
a change of a distance between one of the light sources and a main scanning front principal point, when a temperature increases by 1° C., is represented by Δd1,
a focal length of the first optical system in the main scanning direction is represented by f1, and
a focal length of the second optical system in the main scanning direction is represented by f2, then
the following relation (7) is satisfied:

$$\Delta m1 + \Delta m2 + \Delta m3 - \Delta d1 \times (f2/f1)^2 < Wm/40 \quad (7).$$

12. The multi-beam optical scanning device as claimed in claim 7, wherein
assuming that
in the first optical system, a change of a position of a sub-scanning beam waist caused by power variation of a refractive portion, when a wavelength of one of the light sources increases by 1 nm, is represented by Δs'1, and a change of a position of the sub-scanning beam waist caused by power variation of a diffractive portion, when a wavelength of one of the light sources increases by 1 nm, is represented by Δs'2,
in the second optical system, a change of a position of a main-scanning beam waist caused by power variation, when a wavelength of one of the light sources increases by 1 nm, is represented by Δs'3, and
a depth of a diameter of the sub scanning beam on the scanning surface is represented by Ws,
the following relation (8) is satisfied:

$$|\Delta s'1 + \Delta s'2 + \Delta s'3| < Ws/2 \quad (8).$$

13. The multi-beam optical scanning device as claimed in claim 12, wherein the following relation (9) is satisfied:

$$\Delta s'1 + \Delta s'2 + \Delta s'3 < 0 \quad (9).$$

14. The multi-beam optical scanning device as claimed in claim 13, wherein
assuming that
in the first optical system, a change of a position of the sub-scanning beam waist caused by power variation of a refractive portion, when a temperature increases by 1° C., is represented by Δs1, and a change of a position of the sub-scanning beam waist caused by power variation of a diffractive portion, when a temperature increases by 1° C., is represented by Δs2,
in the second optical system, a change of a position of a sub-scanning beam waist caused by power variation, when a temperature increases by 1° C., is represented by Δs3,
a change of a distance between one of the light sources and a sub scanning front principal point, when a temperature increases by 1° C., is represented by Δd1,
a magnification of the first optical system in the sub scanning direction is represented by ⊕1, and a magnification of the second optical system in the sub scanning direction is represented by β2, then the following relation (10) is satisfied:

$$\Delta s1+\Delta s2+\Delta s3-\Delta d1\times(\beta 1\times\beta 2)^2 < Ws/40 \qquad (10).$$

15. The multi-beam optical scanning device as claimed in claim 9, wherein the first optical system includes at least one resin lens having a diffracting surface.

16. The multi-beam optical scanning device as claimed in claim 1, wherein a diameter of one of the light beams in the sub scanning direction is greater than a diameter of one of the light beams in the main scanning direction.

17. The multi-beam optical scanning device as claimed in claim 4, wherein the first optical system includes at least one resin lens having a diffracting surface.

18. An image forming apparatus, comprising:
a multi-beam optical scanning device;
wherein
the multi-beam optical scanning device includes
a plurality of light sources;
a deflection unit configured to deflect a plurality of light beams from the light sources;
a first optical system configured to guide the light beams from the light sources to the deflection unit; and
a second optical system configured to guide the light beams deflected by the deflection unit to a scanning surface;
wherein
the first optical system includes
a first lens that couples the light beams from the light sources, and
a second lens that guides the light beams from the first lens to the deflection unit, said second lens being an anamorphic element having power at least in a sub scanning direction,
at least the second lens includes a diffracting surface having a power, and
assuming
a magnification in a main scanning direction of a whole optical system of the optical scanning device is represented by βm0,
a magnification in a sub scanning direction of the whole optical system of the optical scanning device is represented by βs0, and
a magnification in a sub scanning direction of the second optical system is represented by βs2, then
the following relation is satisfied:

$$|\beta m0| > |\beta s0|, \text{ and } |\beta s0| > |\beta s2|, \text{ and}$$

assuming
the power of the diffracting surface of the first lens in the main scanning direction is represented by P1m,
the power of the diffracting surface of the first lens in the sub scanning direction is represented by P1s, and the power of the diffracting surface of the second lens in the sub scanning direction is represented by P2s, then
the following relation is satisfied:

$$|P2s| > |P1m|, \text{ and } |P2s| > |P1s|.$$

* * * * *